United States Patent
Miyamae

(10) Patent No.: US 8,237,417 B2
(45) Date of Patent: Aug. 7, 2012

(54) DC-DC CONVERTER, DC-DC CONVERTER CONTROL METHOD, AND ELECTRONIC DEVICE

(75) Inventor: Toru Miyamae, Kasugai (JP)

(73) Assignee: Fujitsu Semiconductor Limited, Yokohama (JP)

( * ) Notice: Subject to any disclaimer, the term of this patent is extended or adjusted under 35 U.S.C. 154(b) by 649 days.

(21) Appl. No.: 12/273,804

(22) Filed: Nov. 19, 2008

(65) Prior Publication Data

US 2009/0167259 A1    Jul. 2, 2009

(30) Foreign Application Priority Data

Dec. 26, 2007   (JP) ................................ 2007-333553

(51) Int. Cl.
*G05F 1/575* (2006.01)
*G05F 1/62* (2006.01)

(52) U.S. Cl. ........ 323/259; 323/283; 323/284; 323/285; 323/299

(58) Field of Classification Search .................. 323/259, 323/271, 282, 284, 285, 299, 225, 283
See application file for complete search history.

(56) References Cited

U.S. PATENT DOCUMENTS

| | | | |
|---|---|---|---|
| 5,831,418 A * | 11/1998 | Kitagawa | 323/222 |
| 6,636,431 B2 * | 10/2003 | Seki et al. | 363/65 |
| 7,116,085 B2 | 10/2006 | Ikezawa | |
| 7,199,563 B2 | 4/2007 | Ikezawa | |
| 7,733,072 B2 * | 6/2010 | Kanakubo | 323/271 |
| 2005/0007089 A1 | 1/2005 | Niiyama et al. | |
| 2007/0290667 A1 | 12/2007 | Nagai et al. | |

FOREIGN PATENT DOCUMENTS

| | | |
|---|---|---|
| CN | 1578083 A | 2/2005 |
| CN | 101090234 A | 12/2007 |
| JP | 09-223837 A | 8/1997 |
| JP | 2003-319644 | 11/2003 |
| JP | 2005-192312 A | 7/2005 |
| JP | 2005-192323 A | 7/2005 |

OTHER PUBLICATIONS

Notice of Reasons for Refusal dated May 29, 2012, from corresponding Japanese Application No. 2007-333553.

* cited by examiner

*Primary Examiner* — Gary L Laxton
(74) *Attorney, Agent, or Firm* — Arent Fox LLP

(57) ABSTRACT

The DC-DC converter includes a control unit that controls a current stored in an inductance and an output voltage output from an output terminal electrically couplable to the inductance. The control unit assigns a first period and a second period to a given period when the output voltage is lower than a given value in response to a load electrically couplable to the output terminal. The first period is where a current is stored in the inductance in response to an input voltage and a reference voltage, and the second period is where the current stored in the inductance is supplied to the output terminal in response to the input voltage and the output voltage.

19 Claims, 17 Drawing Sheets

DC-DC CONVERTER, DC-DC CONVERTER CONTROL METHOD, AND ELECTRONIC DEVICE

CROSS-REFERENCE TO RELATED APPLICATIONS

This application claims the benefit of priority from Japanese Patent Application No. 2007-333553 filed on Dec. 26, 2007, the entire contents of which are incorporated herein by reference.

BACKGROUND OF THE INVENTION

1. Field of the Invention

This application relates to a DC-DC converter.

2. Description of Related Art

A DC-DC converter converts an input voltage from a battery coupled thereto and supplies a variety of circuits with a stabilized output voltage. The circuits to which the DC-DC converter supplies a power supply voltage include circuits that are incorporated in electronic devices such as personal computers, mobile phones, gaming devices, and digital cameras.

Techniques related to the DC-DC converter are disclosed in Japanese Laid-open Patent Publication No. 2005-192312, Japanese Laid-open Patent Publication No. 2005-192323, and Japanese Laid-open Patent Publication No. H9-223837.

SUMMARY

According to one aspect of an embodiment, a DC-DC converter is provided. The DC-DC converter includes a control unit that controls a current stored in an inductance and an output voltage output from an output terminal electrically couplable to the inductance. The control unit assigns a first period and a second period to a given period when the output voltage is lower than a given value in response to a load electrically couplable to the output terminal. The first period is where a current is stored in the inductance in response to an input voltage and a reference voltage, and the second period is where the current stored in the inductance is supplied to the output terminal in response to the input voltage and the output voltage.

Additional advantages and novel features of the invention will be set forth in part in the description that follows, and in part will become more apparent to those skilled in the art upon examination of the following or upon learning by practice of the invention.

DESCRIPTION OF PREFERRED EMBODIMENTS

Figure 1:
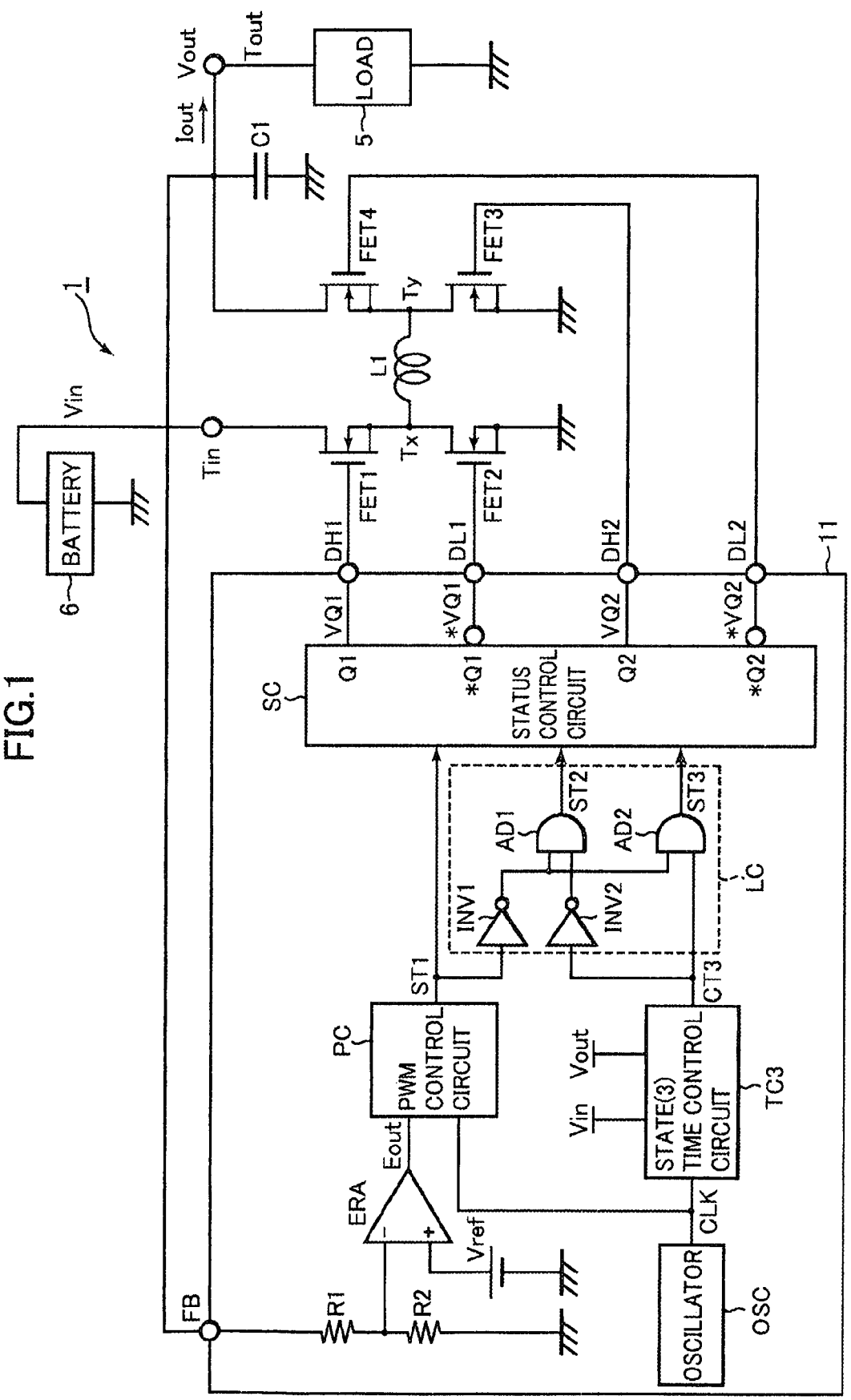
FIG. 1 illustrates a first embodiment.

FIG. 1 illustrates a first embodiment. When a load suddenly increases, a speed of a transient response is set to high in a step up/step down DC-DC converter 1 according to the first embodiment. The DC-DC converter 1 is a H-bridge-type switching regulator. The DC-DC converter 1 includes a choke coil L1, transistors FET1, FET2, FET3, and FET4, an output capacitor C1, and a control circuit 11. An input terminal Tin is coupled to a drain terminal of the transistor FET1. A battery 6 is coupled to the input terminal Tin into which an input voltage Vin is input. The battery 6 may be, for example, a battery used in mobile devices such as mobile phones. The battery may include a DC battery, a lithium battery or the like. The battery 6 may be a power supply obtained by DC-converting and transforming an AC power supply or other power supply except for a converter used in a notebook-type personal computer. A source terminal of the transistor FET1 is coupled to a terminal Tx of the choke coil L1 and a drain terminal of the transistor FET2. A source terminal of the transistor FET2 is coupled to a reference electric potential. Gate terminals of the transistors FET1 and FET2 are coupled to output terminals DH1 and DL1 of the control circuit 11, respectively.

A drain of the transistor FET4 is coupled to an output terminal Tout. The stepped-up/stepped-down input voltage Vin is output as an output voltage Vout from the output terminal Tout. The output capacitor C1 is coupled between the output terminal Tout and the reference electric potential so as to store electric power supplied via the choke coil L1. The output terminal Tout is coupled to an input terminal FB of the control circuit 11. A load 5 is coupled to the output terminal Tout. The load 5 may be, for example, an internal circuit of a mobile device, such as a personal computer, a mobile phone, a gaming device, a digital camera, and other electronic devices, or a rechargeable battery, such as a lithium battery or the like that is incorporated in a note-type personal computer or the like. A source terminal of the transistor FET4 is coupled to a terminal Ty of the choke coil L1 and a drain terminal of the transistor FET3. A source terminal of the transistors FET3 is coupled to the reference electric potential. Gate terminals of the transistors FET3 and FET4 are respectively coupled to the output terminals DH2 and DL2 of the control circuit 11.

The control circuit 11 includes an error amplifier ERA, a PWM control circuit PC, a status control circuit SC, an oscillator OSC, a state (3) time control circuit TC3, a logic unit LC, and resistor elements R1 and R2. The logic unit LC includes AND circuits AD1 and AD2 and inverters INV1 and INV2. The logic unit LC masks state signals ST2 and ST3 in a period where a state signal ST1 is a high level. The logic unit LC masks the state signal ST3 in a period where the state signal ST1 is a low level and the state signal ST2 is the high level. The input terminal FB is coupled to one end of the resistor element R1 that is coupled, via the resistor element R2, to the reference electric potential. A coupling node between the resistor elements R1 and R2 is coupled to an inverting input terminal of the error amplifier ERA. A reference voltage Vref is applied to a non-inverting input terminal of the error amplifier ERA. The error amplifier ERA outputs an output signal Eout. The oscillator OSC outputs a clock signal CLK. The PWM control circuit PC receives the output signal Eout and the clock signal CLK and outputs the state signal ST1. The state signal ST1 is input to both the status control circuit SC and, via the inverter INV1, to the AND circuits AD1 and AD2. The state (3) time control signal TC3 receives the clock signal CLK and outputs a control signal CT3. The control signal CT3 is input to both the AND circuit AD2 and, via the inverter INV2, to the AND circuit AD1. The state signal ST2 output from the AND circuit AD1 is input to the status control circuit SC. The state signal ST3 output from the AND circuit AD2 is input to the status control circuit SC.

Output terminals Q1 and Q2 of the status control circuit SC are coupled to the output terminals DH1 and DH2. On the other hand, output terminals *Q1 and *Q2 of the status control circuit SC are coupled to the output terminals DL1 and DL2. The output terminals Q1, *Q1, Q2, and *Q2 output control signals VQ1, *VQ1, VQ2, and *VQ2, respectively. The status control circuit SC controls the control signals VQ1, *VQ1, VQ2, and *VQ2 based upon the state signals ST1 and ST3.

Figure 2:
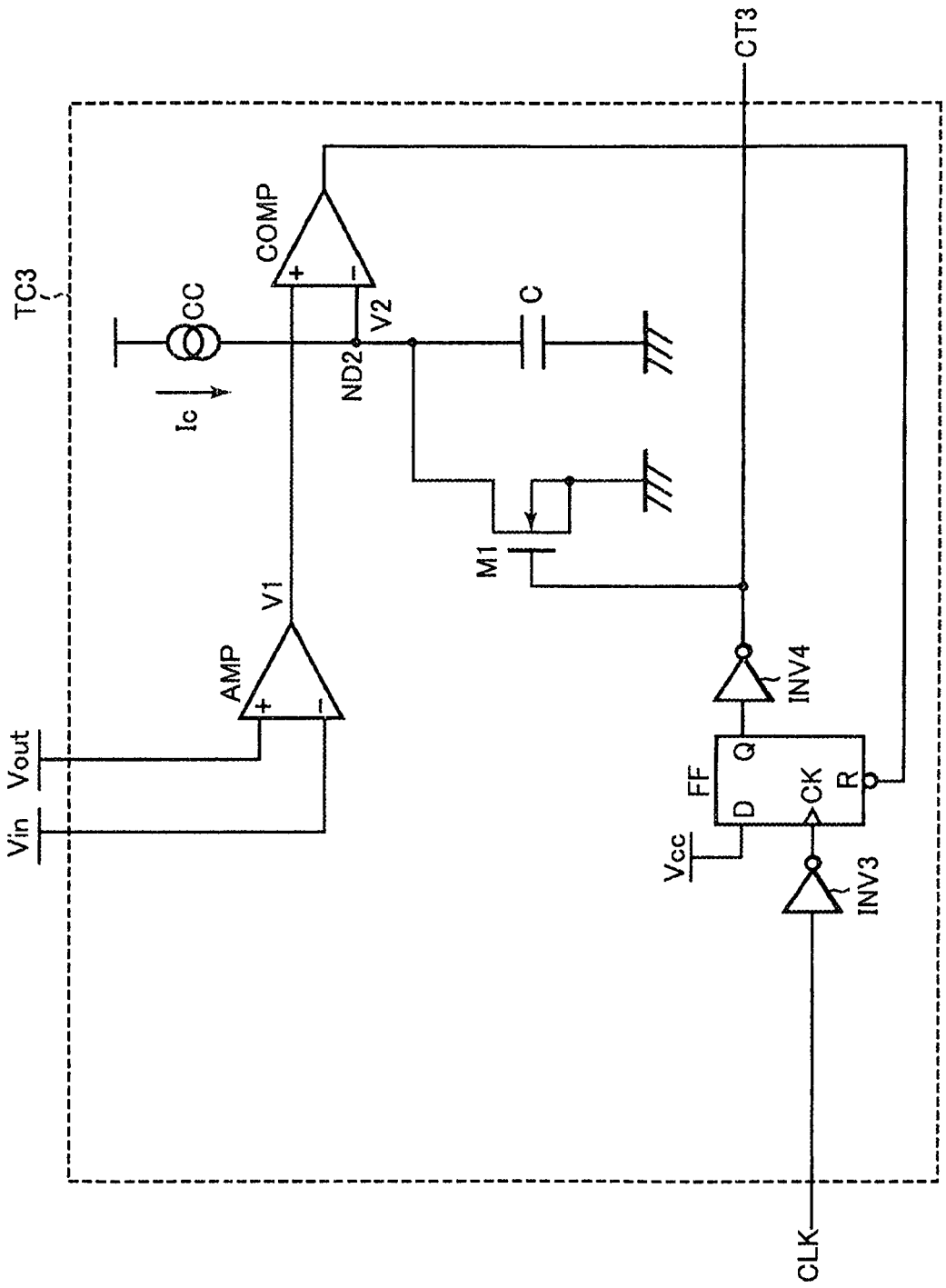
FIG. 2 illustrates a state (3) time control circuit.

FIG. 2 illustrates the state (3) time control circuit TC3. The input voltage Vin is input to an inverting input terminal of an amplifier AMP and the output voltage Vout is input to a non-inverting input terminal of the amplifier AMP. A power supply voltage Vcc is input to a D terminal of a flip-flop FF. The clock signal CLK is input via an inverter INV3 to a CK terminal of the flip-flop FF. An output signal from a Q terminal of the flip-flop FF is output as the control signal CT3 to an outside of the state (3) time control circuit TC3 via an inverter INV4 and also input to a gate terminal of a transistor M1. A source terminal of the transistor M1 is grounded and a drain terminal of the transistor M1 is coupled to a node ND2. One end of a capacitor C is grounded and the other end is coupled to the node ND2. A constant current source CC and an inverting input terminal of a comparator COMP are coupled to the node ND2. An output voltage V1 output from the amplifier AMP is input to a non-inverting input terminal of the comparator COMP and a voltage V2 of the node ND2 is input to the inverting input terminal thereof. An output terminal of the comparator COMP is coupled to an R terminal of the flip-flop FF.

Figure 3:
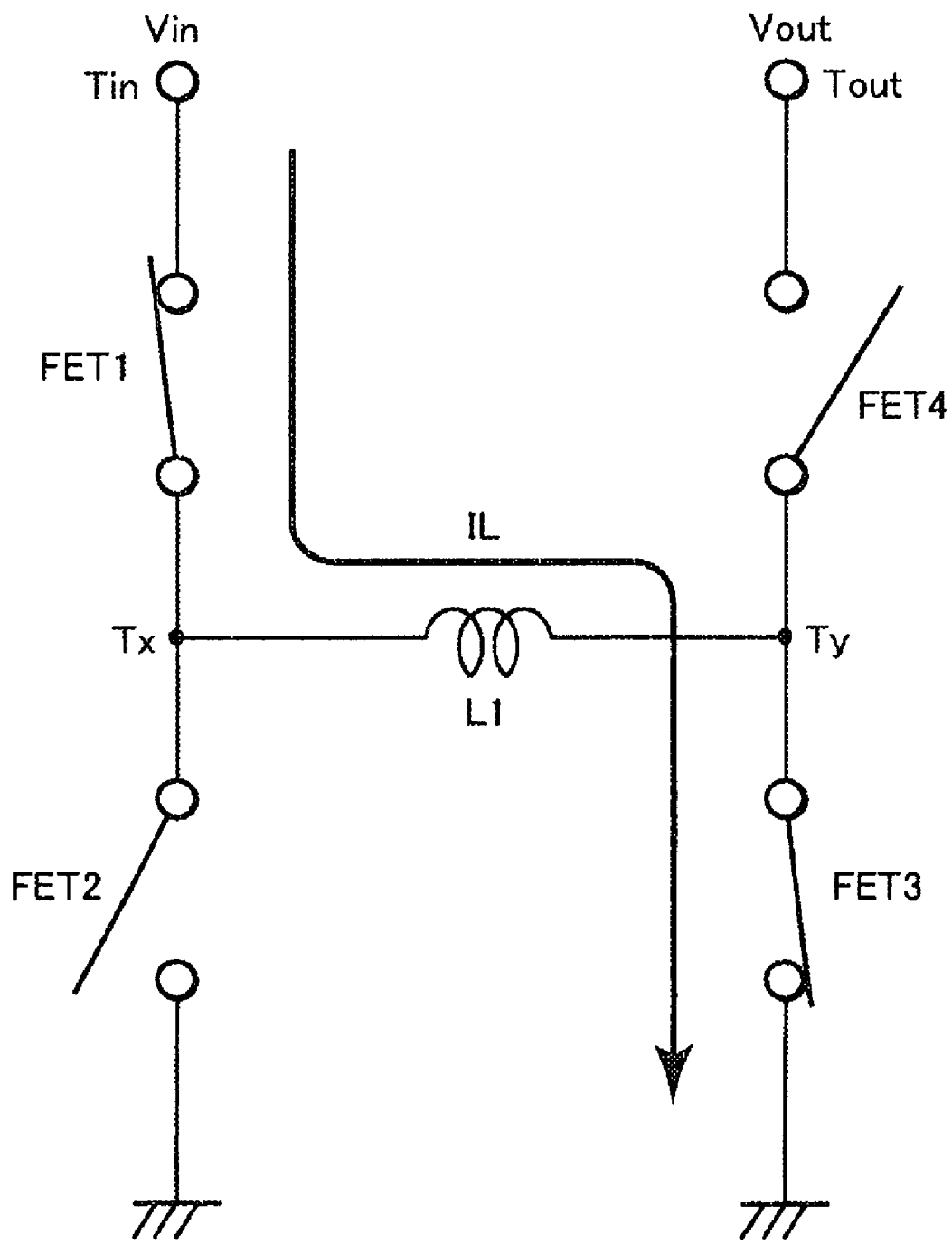
FIG. 3 illustrates a state of a DC-DC converter.
Figure 4:
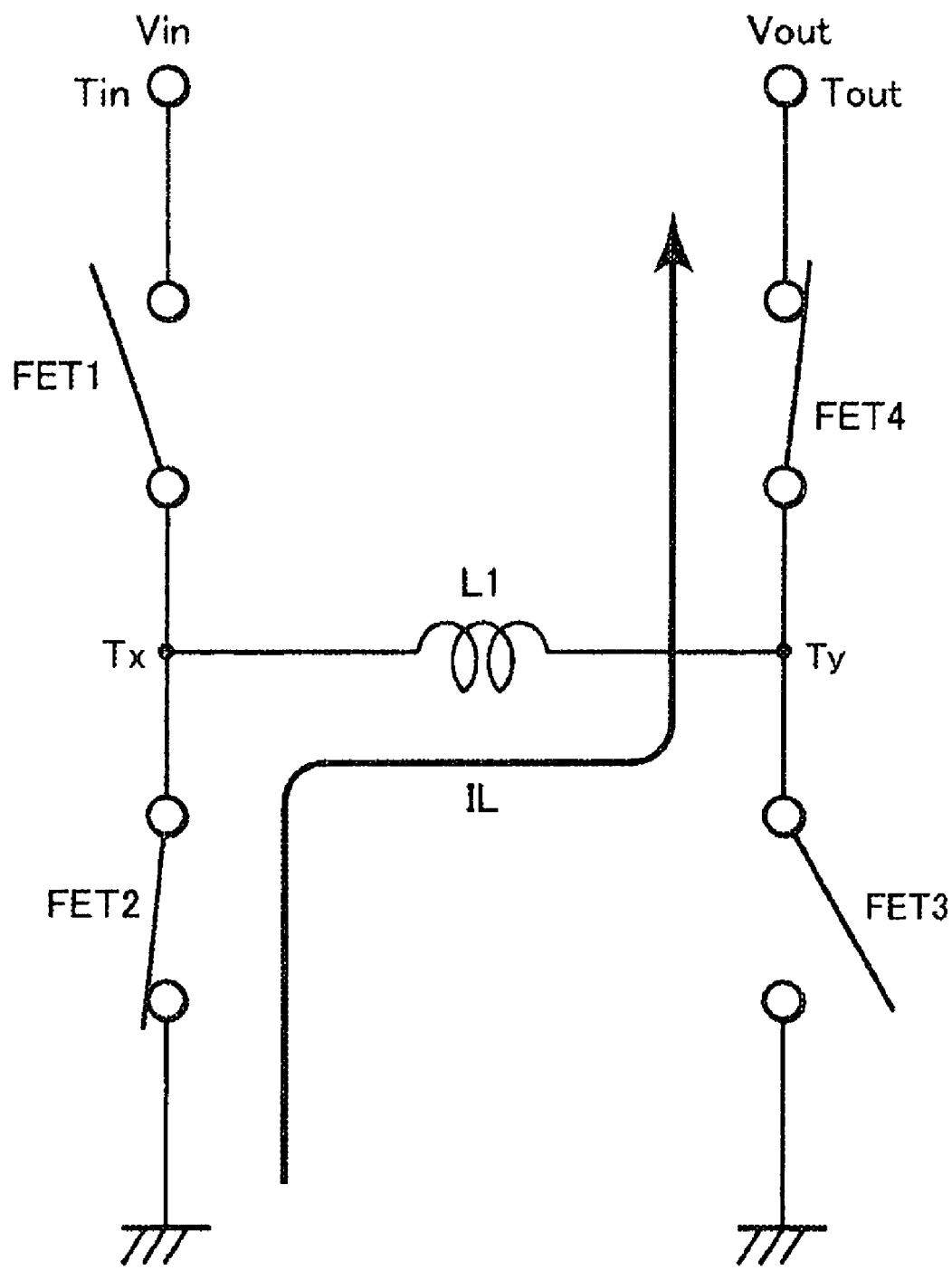
FIG. 4 illustrates another state of the DC-DC converter.
Figure 5:
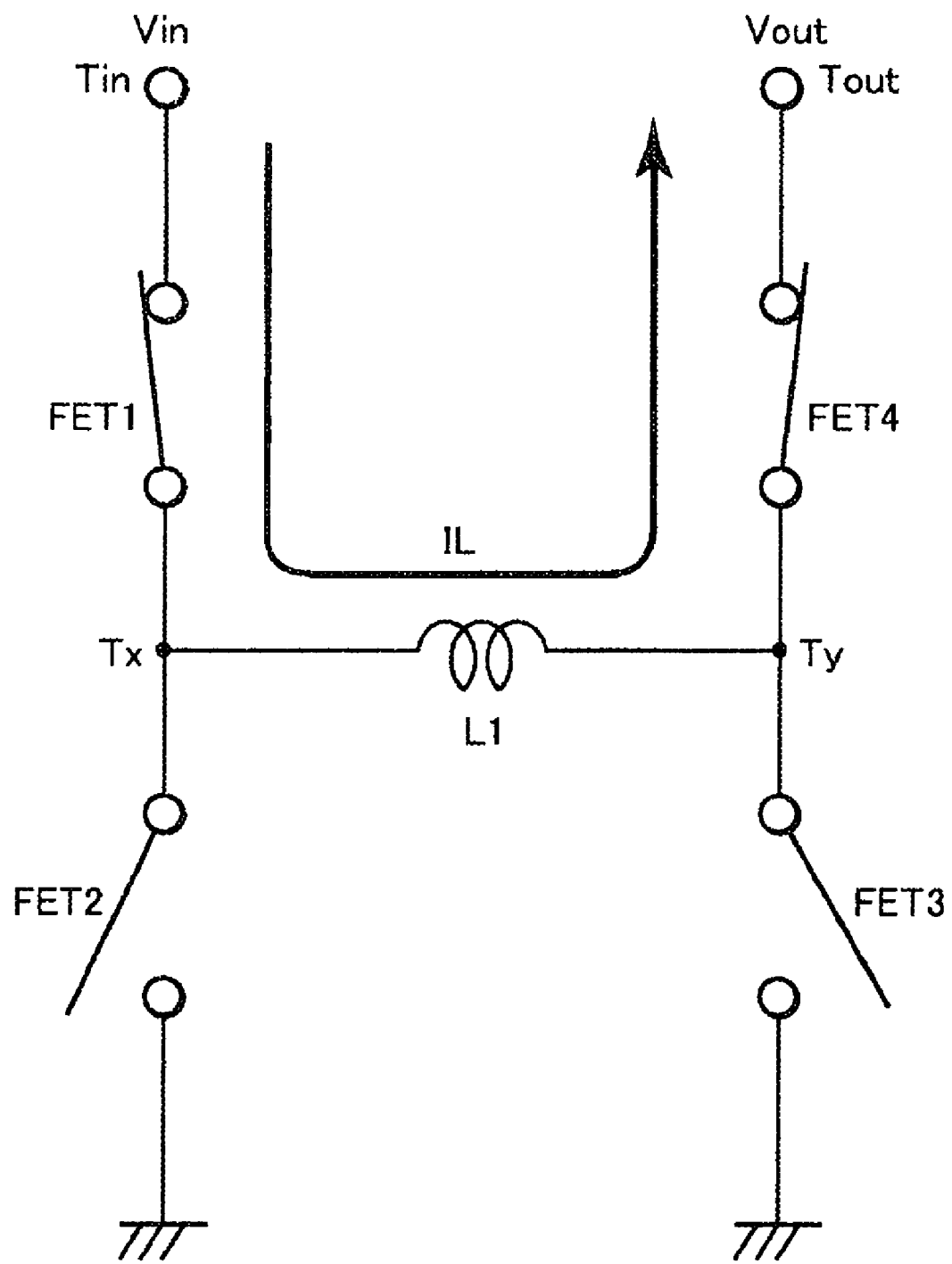
FIG. 5 illustrates yet another state of the DC-DC converter.

FIGS. 3, 4, and 5 illustrate states of the DC-DC converter 1. Transition to three different states takes place in the DC-DC converter 1 in response to combinations of ON/OFF states of the transistors FET1, FET2, FET3, and FET4.

If the control signals VQ1 and VQ2 are a high level and the control signals *VQ1 and *VQ2 are a low level, the transistors FET1 and FET3 turn ON and the transistors FET2 and FET4 turn OFF. As illustrated in FIG. 3, the terminal Tx of the choke coil L1 is coupled to the input terminal Tin and the terminal Ty thereof is coupled to the reference electric potential, so that a transition to a state (1) is performed. In the state (1), energy from an input terminal Tin side is stored in the choke coil L1, and an inductor current IL increases at a steep and uniform gradient with time.

If the control signals *VQ1 and *VQ2 are a high level and the control signals VQ1 and VQ2 are a low level, the transistors FET1 and FET3 turn OFF and the transistors FET2 and FET4 turn ON. As illustrated in FIG. 4, the terminal Tx of the choke coil L1 is coupled to the reference electric potential and the terminal Ty of the choke coil L1 is coupled to the output terminal Tout, so that a transition to a state (2) is performed. In the state (2), the energy is discharged from the choke coil L1 toward an output terminal Tout side and the inductor current IL decreases at a steep and uniform gradient with time.

If the control signals VQ1 and *VQ2 are a high level and the control signals *VQ1 and VQ2 are a low level, the transistors FET1 and FET4 turn ON and the transistors FET2 and FET3 turn OFF. As illustrated in FIG. 5, the terminal Tx of the choke coil L1 is coupled to the input terminal Tin and the terminal Ty of the choke coil L1 is coupled to the output terminal Tout, so that a transition to the state (3) is performed. In the state (3), if the input voltage Vin is higher than the output voltage Vout, the energy from the input terminal Tin side is stored in the choke coil L1 and is contemporaneously supplied to the output terminal Tout side, and the inductor current IL increases at a constant gradient with time. If the input voltage Vin is lower than the output voltage Vout, the energy is discharged from the choke coil L1 toward the output terminal Tout side, and the inductor current IL decreases at a constant gradient with time.

Figure 6:
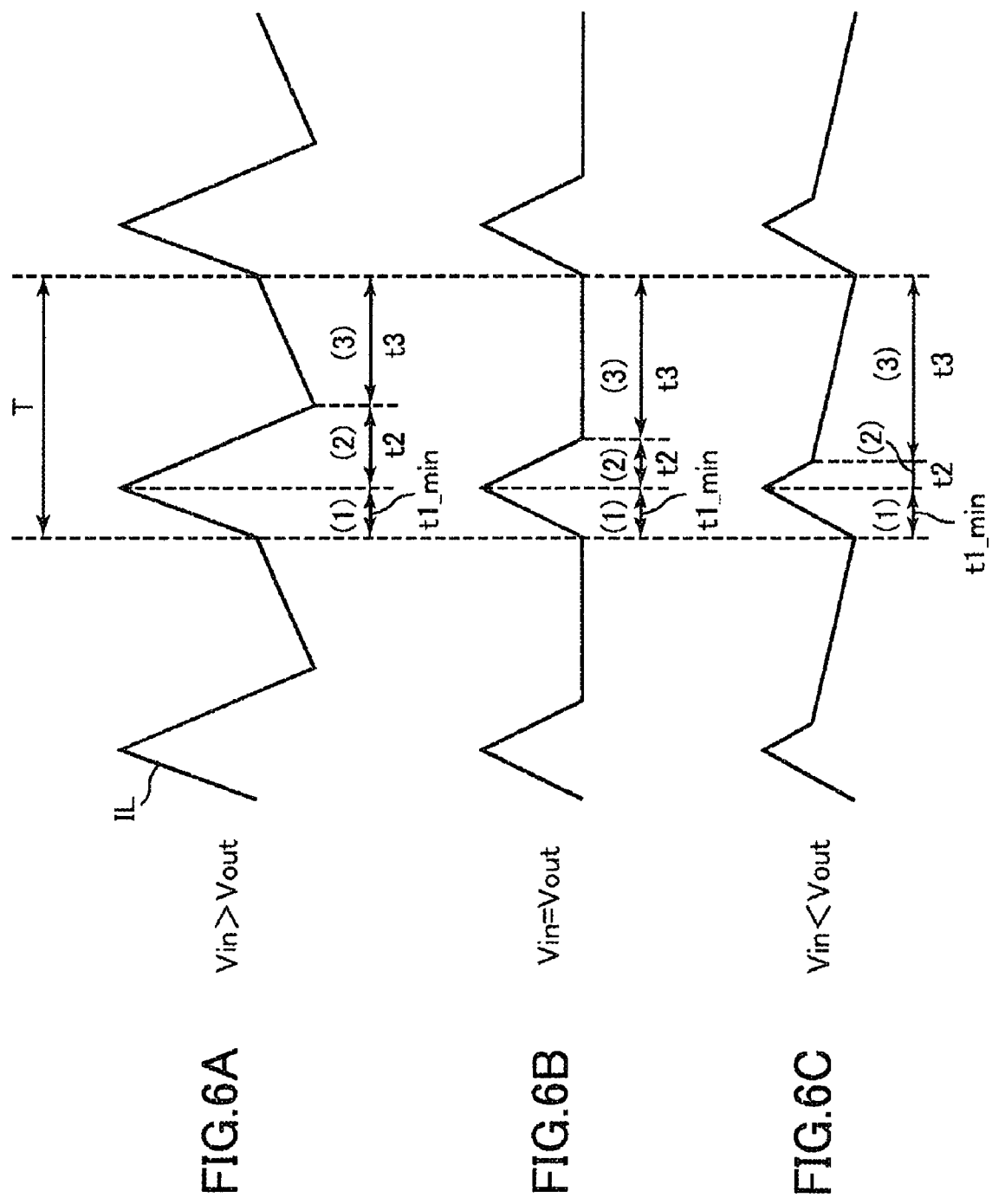
FIG. 6 illustrates a waveform diagram of inductor current.

FIGS. 6A to 6C illustrate waveform diagrams of the inductor current IL. Since a state of a load (not illustrated) coupled to the output terminal Tout is kept constant, the output voltage Vout becomes a steady state. FIG. 6A is the waveform diagram where a step down operation of "input voltage Vin>output voltage Vout" is performed. FIG. 6B is the waveform diagram where a step up/step down operation of "input voltage Vin=output voltage Vout" is performed. FIG. 6C is the waveform diagram where a step up operation of "input voltage Vin<output voltage Vout." is performed. A single operation cycle T includes the state (1) to the state (3) in any of the cases illustrated in FIGS. 6A to 6C, during the steady state. The transition takes place in the order from the state (1) through the state (2) to the state (3) in the operation cycle T.

In FIG. 6A, a time period of the state (1) is fixed at a minimum time period t1_min and PWM control is performed in a time period t2 of the state (2) and a time period t3 of the state (3). The minimum time period t1_min is a minimum PWM period in the PWM control circuit PC. The minimum PWM period is determined based upon delay times or the like of a variety of circuits, such as a comparator, a flip-flop, and so on, which are incorporated inside the PWM control circuit PC.

As illustrated in FIGS. 6A and 6B, the increasing gradient of the inductor current IL in the state (1) is determined based upon (Vin/L), where L represents an inductance value of the choke coil L1. The decreasing gradient of the inductor current IL in the state (2) is determined based upon –(Vout/L). The increasing gradient of the inductor current IL (FIG. 6A) or the decreasing gradient of the inductor current IL (FIG. 6C) in the state (3) is less than the increasing gradient in the state (1) or the decreasing gradient in the state (2). If the input voltage Vin is close to the output voltage Vout, the gradient of the inductor current IL in the state (3) is zero or close to zero (FIG. 6B).

In order to improve efficiency of the DC-DC converter 1 in the steady state, it is necessary that storing wasted energy in the choke coil L1 and discharging the wasted energy from the choke coil L1 be reduced. Making the time period of the state (1) equal to the minimum time period t1_min allows the energy stored in the choke coil L1 to be minimized. A circuit that achieves the effective and ideal waveforms illustrated in FIGS. 6A to 6C is necessary.

The time period t2 and the time period t3 necessary to achieve the waveforms illustrated in FIGS. 6A to 6C will be determined. If the output voltage Vout of the DC-DC converter 1 is the steady state, it is necessary that, in any of the cases illustrated in FIGS. 6A to 6C, an increased amount of the inductor current IL increased with the minimum time period t1_min of the state (1) be decreased with the time period t2 of the state (2) and the time period t3 of the state (3), so that the output voltage Vout may be stabilized. To achieve this, it is necessary that the increased amount of the inductor current IL increased with the minimum time period t1_min be equal to the decreased amount of the inductor current IL decreased with during the time period t2 and the time period t3. The above relationship is represented by the following equation.

$$(Vin/L)*t1\_min-(Vout/L)*t2+\{(Vin-Vout)/L\}*t3=0 \quad (1)$$

$$T=t1\_min+t2+t3 \quad (2)$$

The time period t2 and the time period t3 are obtained by Equation (1) and Equation (2) to achieve the waveforms illustrated in FIGS. 6A to 6C. The time period t3 that makes the time period of the state (1) equal to the minimum time period t1_min is obtained by the following equation (3).

$$t3=(Vin/Vout)*(T-t1\_min)-t1\_min \quad \text{Equation (3)}$$

The time period t2 that makes the time period of the state (1) equal to the minimum time period t1_min may be obtained by the following equation (4).

$$t2=T-t1\_min-t3 \quad \text{Equation (4)}$$

The time period t2 and the time period t3 necessary for achieving the waveforms illustrated in FIGS. 6A to 6C may be obtained when determining values of the input voltage Vin, the output voltage Vout, and the minimum time period t1_min.

In order to control the DC-DC converter (1) based upon the minimum time period t1_min, the time period t2, and the time period t3 obtained from the above equations, any one of the state time periods among the state (1) to the state (3) is defined as a fixed value obtained by the above equations, and the remaining two state time periods are defined as variables based upon the PWM control. Since a feedback loop is carried out to stabilize the output voltage Vout with the PWM control, the remaining two state time periods, on which the PWM-control is performed, fall within the state time periods obtained by the above equations.

Figure 7:
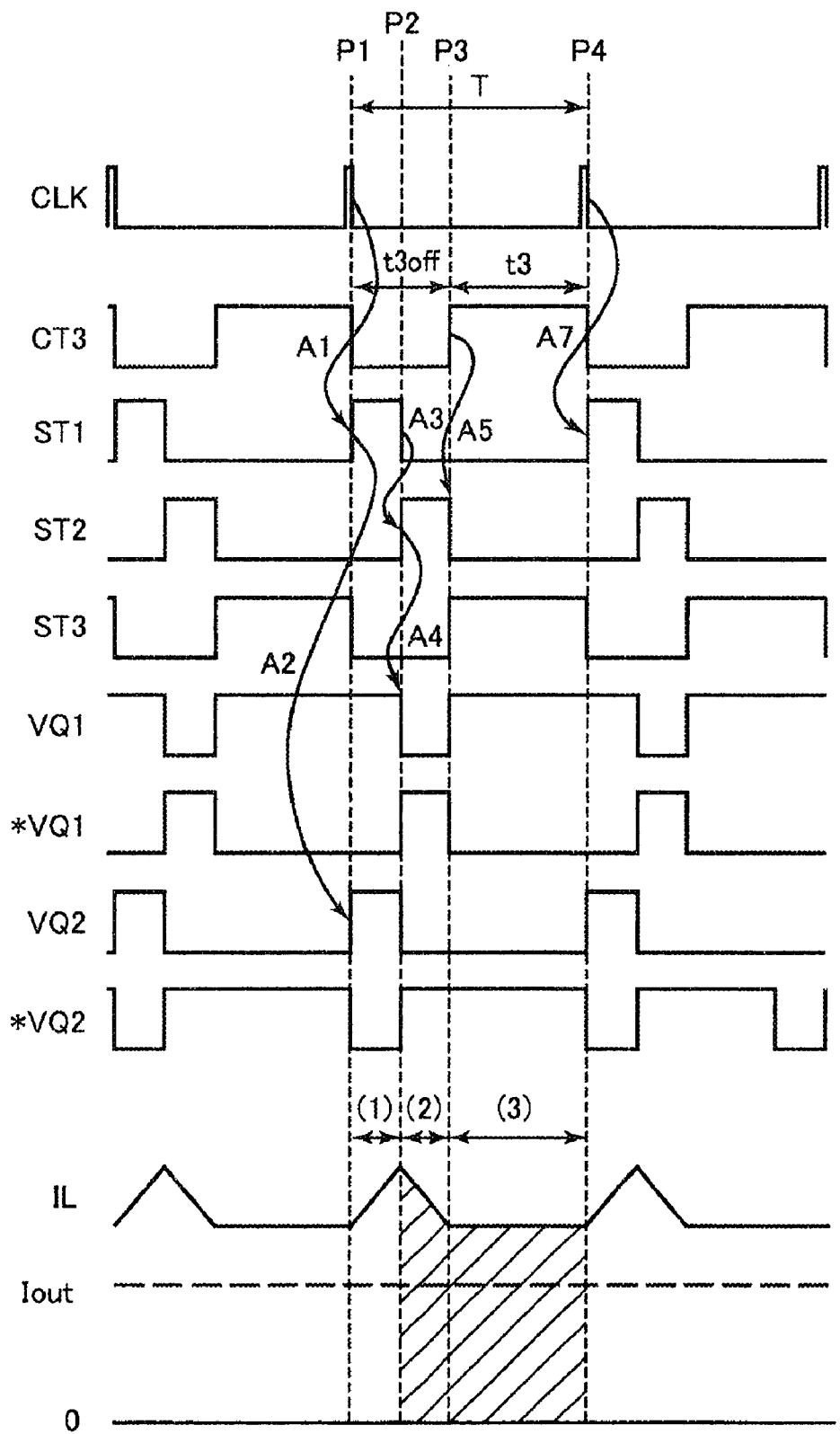
FIG. 7 illustrates a waveform diagram of the DC-DC converter in a steady state.

FIG. 7 illustrates a waveform diagram of the DC-DC converter 1 in the steady state. The clock signal CLK is a clock pulse of an operation cycle T. An output current Iout is an average value of the inductor current IL. FIG. 7 illustrates operations of the DC-DC converter 1. In the operations, a value of the input voltage Vin is close to a value which is substantially equal to that of the output voltage Vout, and a gradient of a current sensing signal Vs in the state (3) is zero or close to zero.

At a point of time P1 (FIG. 7), the state signal ST1 output from the PWM control circuit PC illustrated in FIG. 1 makes a transition to a high level (arrow A1) in response to a falling edge of the clock pulse of the clock signal CLK. The state signal ST3 make a transition to a low level. The status control circuit SC illustrated in FIG. 1 causes the control signal VQ2 to make a transition to a high level and causes the control signal *VQ2 to make a transition to a low level (arrow A2) in response to an input of the state signal ST1 at a high level. The transition to the state (1) is performed and the operation cycle T is started. Since the choke coil L1 receives the energy from the input side with its output side being shutoff, in the state (1), the inductor current IL increases with the steep gradient.

The PWM control circuit PC illustrated in FIG. 1 includes a comparator (not illustrated). The comparator compares the current sensing signal obtained by detecting the inductor current IL to the output voltage Eout. At a point of time P2, the state signal ST1 output from the PWM control circuit PC makes a transition to a low level when the current sensing signal reaches the output signal Eout. The state signal ST2 output from the AND circuit AD1 illustrated in FIG. 1 makes a transition to a high level (arrow A3) in response to the state signal ST1 making the transition to a low level. The status control circuit SC causes the control signals VQ1 and VQ2 to make a transition to a low level and the control signals *VQ1 and *VQ2 to a high level (arrow A4) in response to the state signal ST2 at a high level being input. The state (1) is switched to the state (2). In the state (2), since the output side of the choke coil L1 is coupled contemporaneously upon the input side being shut off, the inductor current IL decreases with the steep gradient.

At a point of time P3 after the a fixed time period t3off has elapsed from the point of time P1, the control signal CT3 output from the state (3) time control circuit TC3 makes a transition to a high level. The time period t3off is a value (fixed value) obtained by subtracting the time period t3 in the state (3) from the operation cycle T. In response to a rising edge of the control signal CT3, the state signal ST3 makes a transition to a high level and the state signal ST2 makes a transition to a low level (arrow A5). The status control circuit SC causes the control signal VQ1 to make the transition to a low level and the control signal *VQ1 to a high level, in response to the state signal ST3 at a high level. The state (2) is switched to the state (3).

The state (3) is maintained until a point of time P4, at which the time period t3 has elapsed. In the state (3), since the input voltage Vin is close to the output voltage Vout, the gradient of the inductor current IL is zero or close to zero as illustrated in FIG. 7. The inductor current IL is maintained at a value of the point of time P3. The inductor current IL is maintained substantially at a minimum current value during the state (3).

At a point of time P4, the state signal ST1 makes the transition to a high level (arrow A7) in response to a falling edge of the clock signal CLK. The state signal ST3 makes the transition to a low level. Then the operation cycle T is terminated. The time period t3 is defined as the fixed time in the steady state of the output voltage Vout. The PWM control circuit PC PWM-controls the time periods of the state (1) and of the state (2).

The time period t3 is obtained by means of Equation (3) based upon a relationship between the input voltage Vin and the output voltage Vout. The circuit illustrated in FIG. 2 may be one example of a circuit that determines the time period t3 according to Equation (3).

Figure 8:
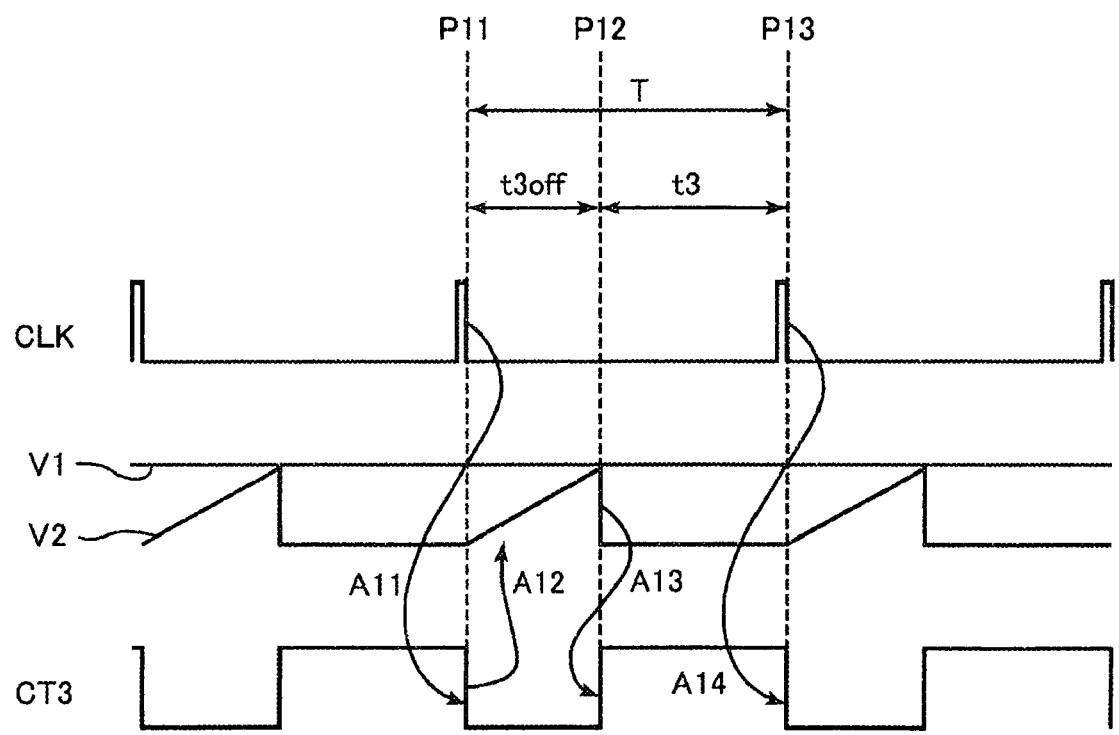
FIG. 8 illustrates a waveform diagram of state (3) time control circuit.

FIG. 8 illustrates a waveform diagram of the state (3) time control circuit. Data is fed into the flip-flop FF illustrated in FIG. 2 at a falling edge of the clock signal CLK, and the control signal CT3 makes a transition to a low level (arrow A11 in FIG. 8). Upon the control signal CT3 making the transition to a low level, the transistor M1 turns OFF and a current Ic output from the constant current source CC as illustrated in FIG. 2 is stored in the capacitor C, thereby the voltage V2 rising (arrow A12).

Upon the voltage V2 reaching the output voltage V1 at a point of time P12, an output voltage of the comparator COMP illustrated in FIG. 2 makes a transition to a low level, and the flip-flop FF is reset. The control signal CT3 makes a transition to a high level and the time period t3off is terminated (arrow A13). Upon the control signal CT3 making the transition to a high level, the transistor M1 turns ON and capacitor C discharges the current, thereby maintaining the voltage V2 at or near zero. In a point of time P13, the control signal CT3 makes the transition to a low level in response to a falling edge of the clock signal CLK, and the time period t3 is terminated (arrow A14 in FIG. 8). One operation cycle T is terminated.

The output voltage V1 output from the amplifier AMP illustrated in FIG. 2 is determined based upon the relationship between the input voltage Vin and the output voltage Vout. Since the output voltage V1 drops in response to a drop in the output voltage Vout, an ON-duty state in the time period t3 increases. Since the output voltage V1 rises in response to a rise in the output voltage Vout, the ON-duty state in the time period t3 decreases. If the current Ic and a capacitance of the capacitor C are appropriately determined, the time period t3 may be determined so that Equation (3) is satisfied based upon the input voltage Vin and the output voltage Vout using the state (3) time control circuit TC3.

The transitions among the states in the operation cycle T are repeated in the following order: state (1)→state (2)→state (3). Since the energy is supplied to the output terminal Tout side in an area illustrated as a shaded area of the inductor current IL in FIG. 7, the output current Iout is supplied to the load.

Figure 9:
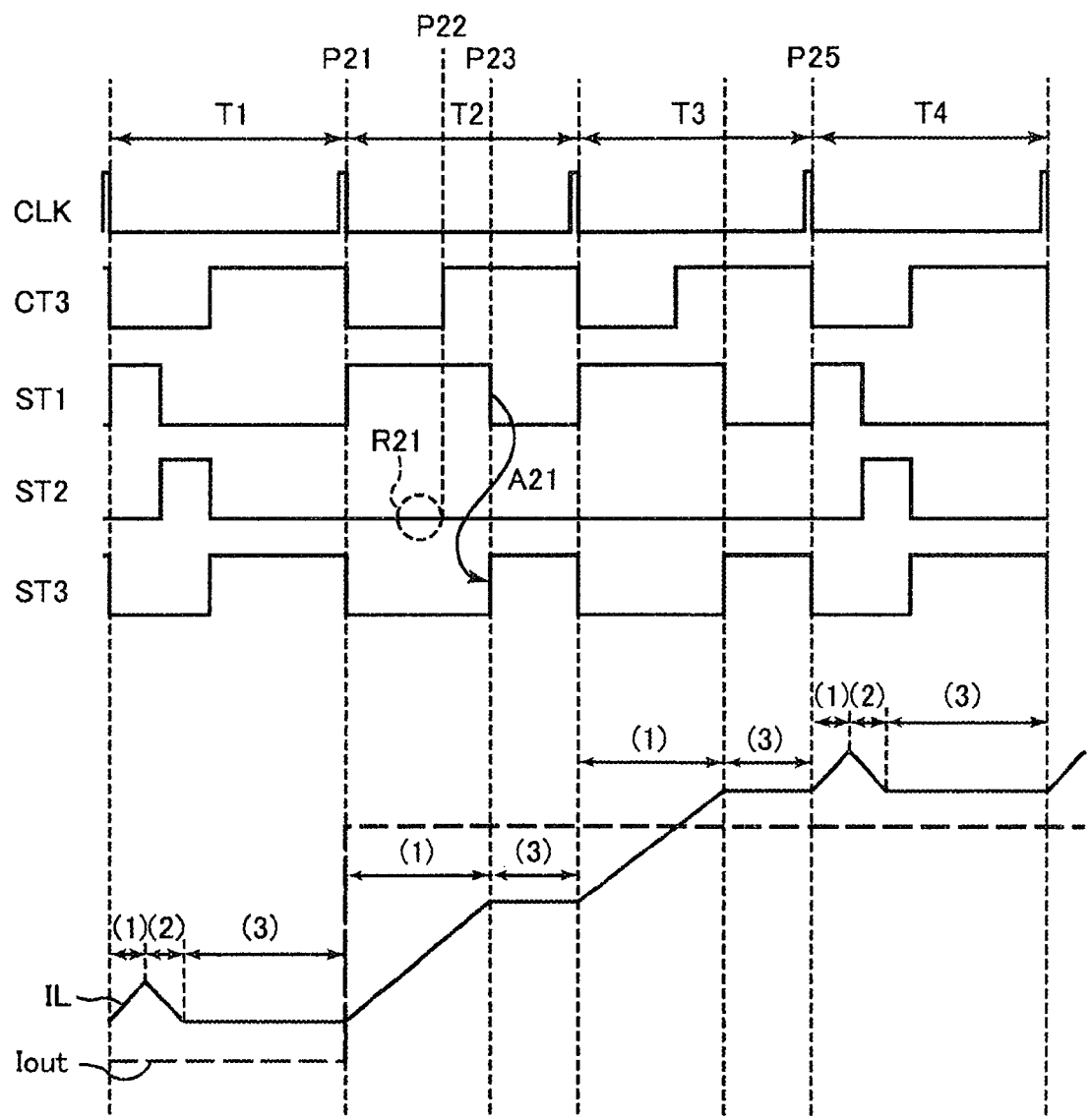
FIG. 9 illustrates a waveform diagram of the DC-DC converter in a transient response.

FIG. 9 illustrates a waveform diagram of the DC-DC converter 1 in a transient response. In FIG. 9, a sudden increase in load makes the DC-DC converter 1 perform the transient response. Operations performed from cycle T1 to cycle T4 are shown in FIG. 9. For example, a load suddenly increases due to a sudden power consumption caused by concurrent operations of a variety of circuits in an electronic device, such as a mobile device or the like, when such an electronic device returns to a normal state after being in a stand-by state that limits the power supply voltage supplied to the circuits to extend the operating time of the device.

The steady state is maintained in the cycle T1. The time t3 is defined as the fixed value in the cycle T1 and the PWM control is performed in the state (1) and in the state (2).

The load suddenly increases at a point of time P21 after a transition to the cycle T2. The transient response takes place during the cycle T2. The output current Iout rises, the output voltage Vout drops, and the output signal Eout rises. In response to the rise in the output signal Eout, a period where the state signal ST1 attains a high level in the operation cycle T becomes longer. If the period where the state signal ST1 is at a high level exceeds a point of time P22 that corresponds to a rising edge of the control signal CT3, the AND circuit AD1 masks the state signal ST2 (area R21).

In response to the state signal ST1 making a transition to a low level at a point of time P23, the state signal ST3 output from the AND circuit AD3 makes a transition to a high level (arrow A21). The state (1) is switched to the state (3).

The transition to the state (2) is not performed in the cycle T2. The PWM control circuit PC and the logic unit LC PWM-control the time periods of the state (1) and of the state (3) in the cycle T2. Owing to the PWM control carried out in the state (1) and in the state (3), the ON-duty of the time period t1 of the state (1) may be increased in response to load states. Consequently, the greater energy is stored in the choke coil L1 through the input voltage Vin side. For a steep rise in the inductor current IL, the speed of a transient response is improved.

Due to the transient response, the transition to the state (2) is not performed in the cycle T3, and the PWM control is performed in the state (1) and in the state (3). The steady state is restored at a point of time P25 in the cycle T4 when the inductor current IL rises to a preferable necessary level. Since the steady state is maintained in the cycle T4, the time period t3 is defined as the fixed value, and the PWM control is performed in the state (1) and in the state (2).

In the first embodiment, the time period t3 is fixed in the cycle T1 and in the cycle T4 where the steady state is maintained, and the PWM control is performed in the state (1) and in the state (2). The waveforms illustrated in FIGS. 6A to FIG. 6C are achieved, and the efficiency may be improved. The transition to the state (2) is not performed in the cycle T2 and in the cycle T3 where the transient response to the sudden increase in load takes place, and the PWM control is performed in the state (1) and in the state (3). Since the time period of the state (1) is made longer in response to the load states, the speed of the transient response may be improved. A method of control may be switched so that the PWM control is performed in the state (1) and in the state (2) during the steady state, and the PWM control is performed in the state (1) and in the state (3) where the transient response takes place. In consequence, the improvement of the efficiency in the steady state and also the response speed of the transient response to a sudden increase in load may be achieved.

Figure 10:
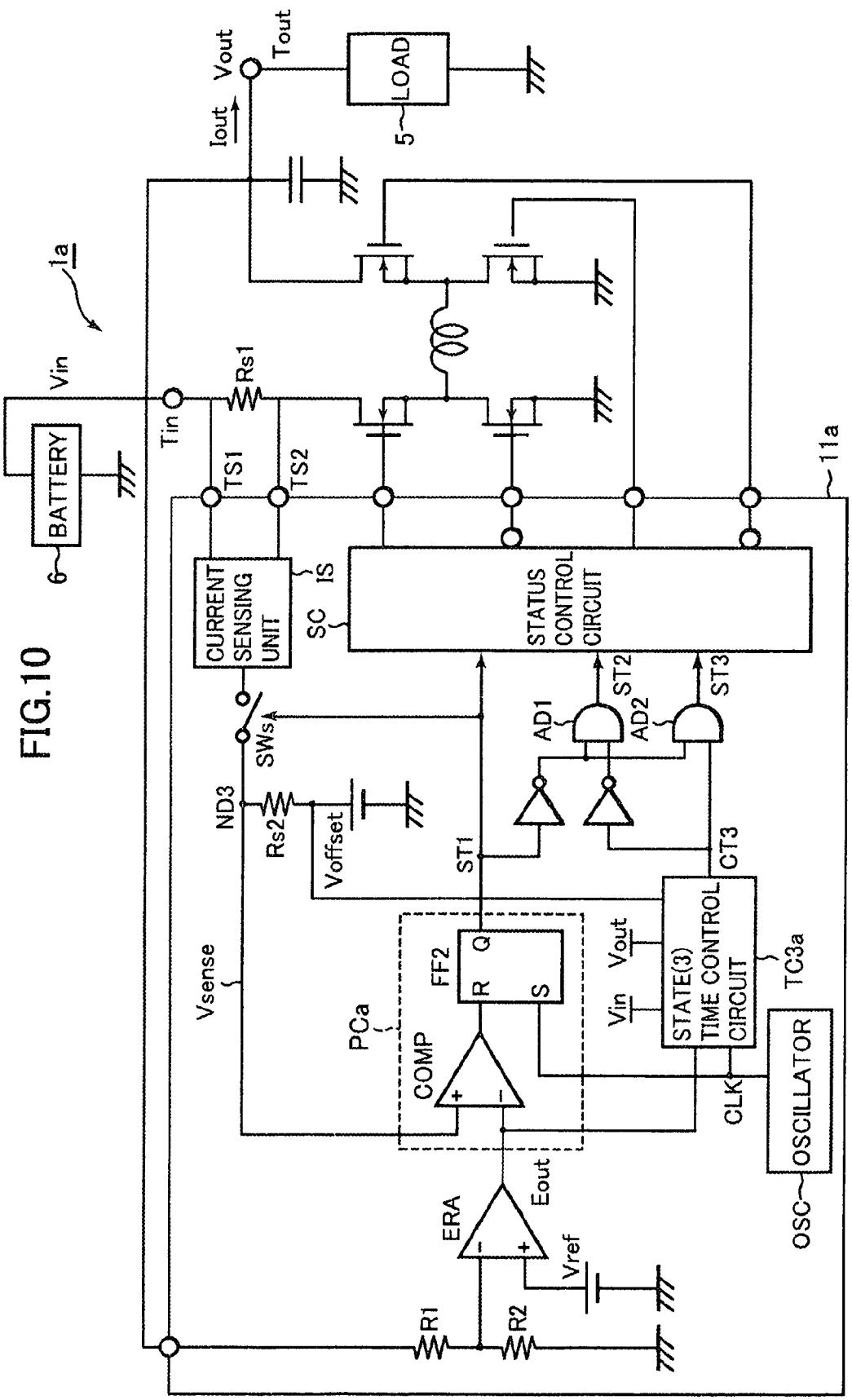
FIG. 10 illustrates a second embodiment.

FIG. 10 illustrates a second embodiment. A step up/step down DC-DC converter 1a as illustrated in FIG. 10 includes a sensing resistor Rs1 between a coupling path of an input terminal Tin and a choke coil L1. Both ends of the sensing resistor Rs1 are coupled to a current sensing unit IS via a terminal TS1 and a terminal TS2. An output terminal of the current sensing unit IS is coupled to a node ND3 via a switch SWs. An offset voltage Voffset is input to the node ND3 via a resistor element Rs2. The offset voltage Voffset is input to a state (3) time control circuit TC3a. The node ND3 is coupled to a non-inverting input terminal of a comparator COMP.

A PWM control circuit PCa includes the comparator COMP and a flip-flop FF2. A voltage value of the node ND3 is input, as a current sensing signal Vsense, to the non-inverting input terminal of the comparator COMP. An output signal Eout is input to an inverting input terminal of the comparator COMP. An output terminal of the comparator COMP is coupled to an R terminal of the flip-flop FF2, and an output terminal of an oscillator OSC is coupled to an S terminal of the flip-flop FF2. The state (3) time control circuit TC3a receives the output signal Eout, the offset voltage Voffset, and a clock signal CLK. The state (3) time control circuit TC3a outputs a control signal CT3. A state signal ST1 output from the flip-flop FF2 is input to a status control circuit SC and to the switch SWs. Other structural elements in the second embodiment are the same as those of the DC-DC converter 1 (FIG.1) in the first embodiment and detailed descriptions thereof are reduced or omitted.

Figure 11:
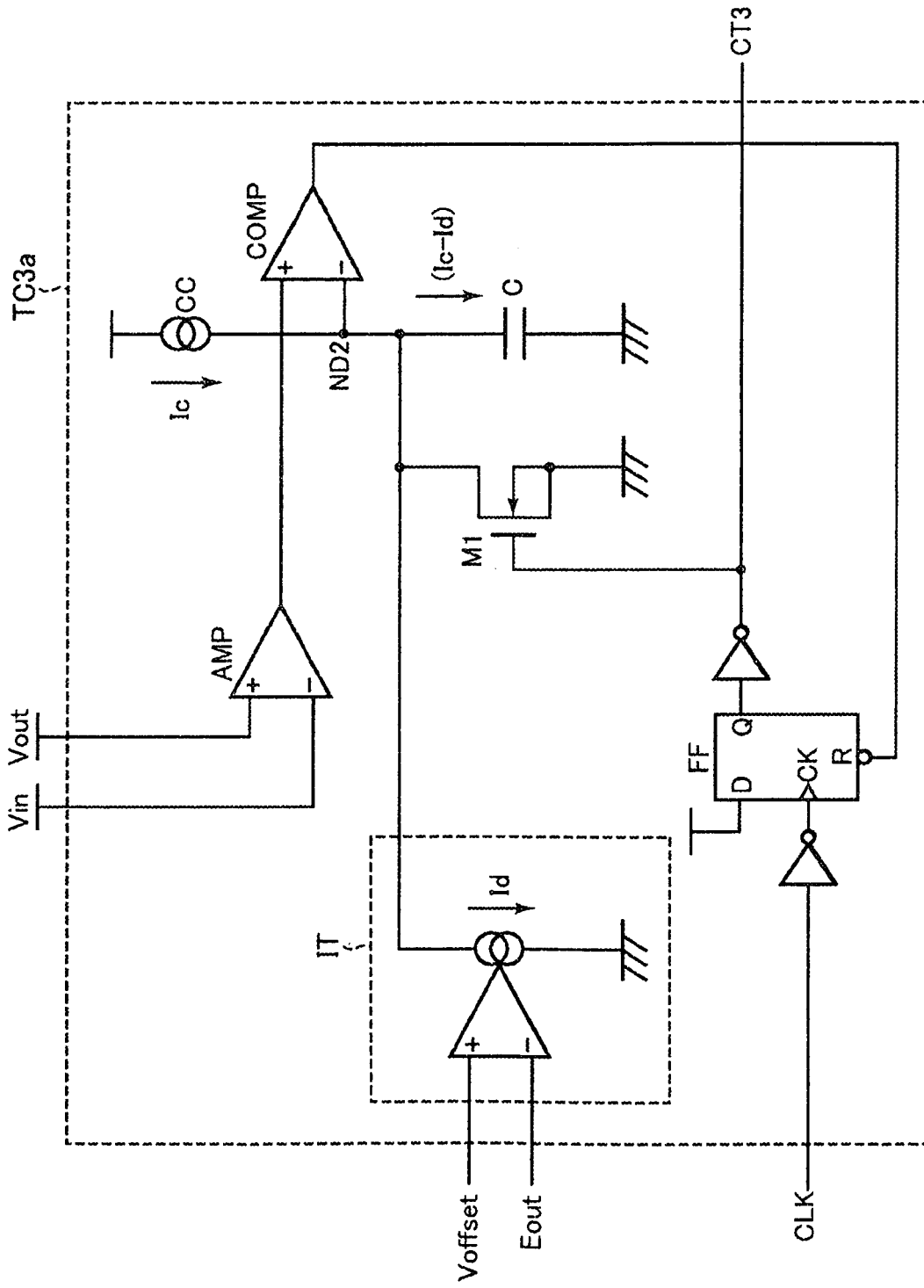
FIG. 11 illustrates a state (3) time control circuit.

FIG. 11 illustrates the state (3) time control circuit TC3a. The state (3) time control circuit TC3a is different from the state (3) time control circuit TC3 (FIG. 2) in the first embodiment and includes a current conversion unit IT. The offset voltage Voffset is input to a non-inverting input terminal of the current conversion unit IT, and the output signal Eout is input to an inverting input terminal. An output terminal of the current conversion unit IT is coupled to a node ND2. A current Id corresponding to a difference between the offset voltage Voffset and the output signal Eout is induced to flow through a constant current source of the current conversion unit IT. Other structural elements in the state (3) time control circuit TC3a are the same as those of the state (3) time control circuit TC3 in the first embodiment and detailed descriptions thereof are reduced or omitted.

Figure 12:
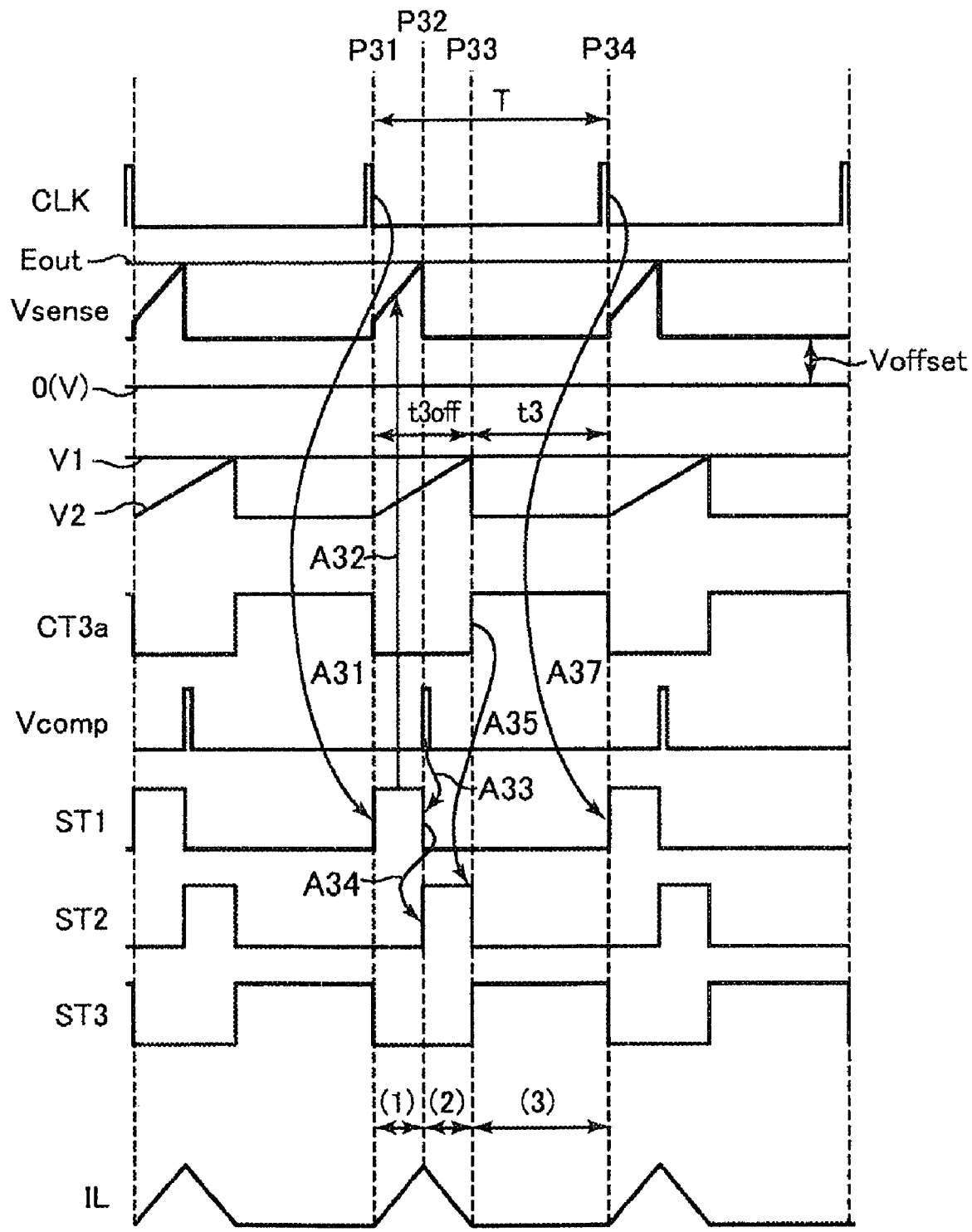
FIG. 12 illustrates a waveform diagram of a DC-DC converter in a steady state.

FIG. 12 illustrates a waveform diagram of the DC-DC converter 1a in a steady state. Since a load state is constant in FIG. 12, an output voltage Vout becomes the steady state. The level of the output signal Eout becomes equal to or higher than that of the offset voltage Voffset in the steady state.

At a point of time P31, the state signal ST1 output from the PWM control circuit PCa makes a transition to a high level (arrow A31) in response to a falling edge of a clock pulse of the clock signal CLK. A state signal ST3 makes a transition to a low level. Transition to a state (1) is performed and an operation cycle T is started.

Since the switch SWs illustrated in FIG. 10 becomes conductive in a period where the state signal ST1 is a high level, the current sensing signal Vsense, to which the offset voltage Voffset is supplied, is input to the non-inverting input terminal of the comparator COMP (arrow A32). The comparator COMP illustrated in FIG. 10 compares the current sensing signal Vsense to the output signal Eout. At a point of time P32, upon the current sensing signal Vsense reaching the output signal Eout, the comparator COMP outputs a pulse signal Vcomp at a high level. Since the flip-flop FF2 illustrated in FIG. 10 is reset, the state signal ST1 makes a transition to a low level (arrow A33). A state signal ST2 output from an AND circuit AD1 makes a transition to a high level (arrow A34) in response to the state signal ST1 making the transition to a low level. The state (1) is switched to a state (2).

At a point of time P33 after a time period t3off has elapsed from the point of time P31, the control signal CT3a output from the state (3) time control circuit TC3a makes a transition to a high level. The state signal ST3 makes a transition to a high level and the state signal ST2 makes a transition to a low level (arrow A35) in response to a rising edge of the control signal CT3a. The state (2) is switched to a state (3).

The state (3) is maintained until a point of time P34 at which a time period t3 has elapsed. At the point of time P34, the state signal ST1 makes the transition to a high level (arrow A37) in response to a falling edge of the clock signal CLK. The state signal ST3 makes the transition to a low level. The operation cycle T is terminated.

The time period t3 may be obtained by means of Equation (3) based upon a relationship between an input voltage Vin and an output voltage Vout. The circuit in FIG. 11 determines the time period t3 according to Equation (3).

Figure 14:
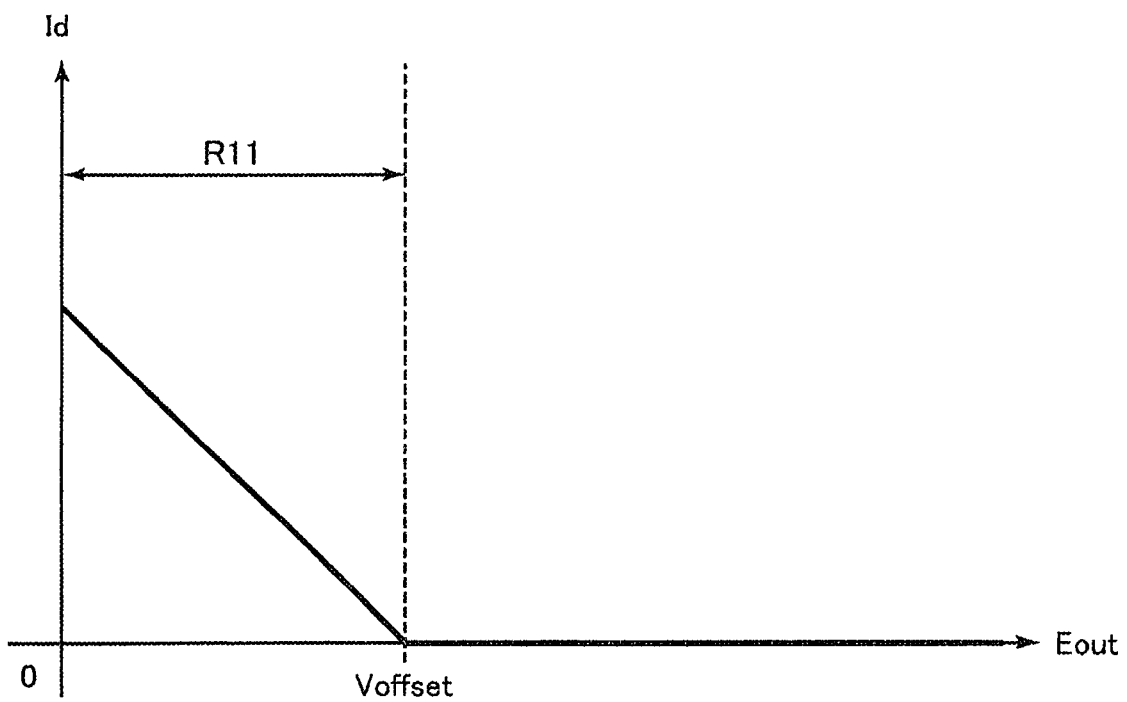
FIG. 14 illustrates a correlation between an output signal Eout and a current Id.

FIG. 14 illustrates a correlation between the output signal Eout of an error amplifier ERA and the current Id induced to flow through the current conversion unit IT. The current Id is zero or close to zero in an area where the level of the output signal Eout is equal to or higher than that of the offset voltage Voffset. The current Id increases in response to a decrease in the output signal Eout in an area R11 where the level of the output signal Eout is equal to or lower than that of the offset voltage Voffset.

At a point of time P31, data is fed into the flip-flop FF illustrated in FIG. 11 at the falling edge of the clock signal CLK, and the control signal CT3a makes a transition to a low level, thereby turning OFF a transistor M1. A current (Ic-Id) is stored in a capacitor C. Since the level of the output signal Eout is made equal to or higher than that of the offset voltage Voffset in the steady state of the output voltage Vout, the current Id is zero or close to zero and the current (Ic-Id) attains a maximum value. As a result, a rising gradient of a voltage V2 reaches a maximum value. At a point of time P33, upon the voltage V2 reaching an output voltage V1, the control signal CT3a makes the transition to a high level and the time period t3off is terminated. At a point of time P34, in response to the falling edge of the clock signal CLK, the control signal CT3a makes the transition to a low level and the time period t3 is terminated. One operation cycle T is terminated.

If the output voltage Vout is in the steady state, the time period t3 is defined as a fixed value and PWM control is performed in the state (1) and in the state (2). The other operations in the second embodiment are the same as those of the state (3) time control circuit TC3 (FIG. 2) in the first embodiment and detailed descriptions are reduced or omitted.

Figure 13:
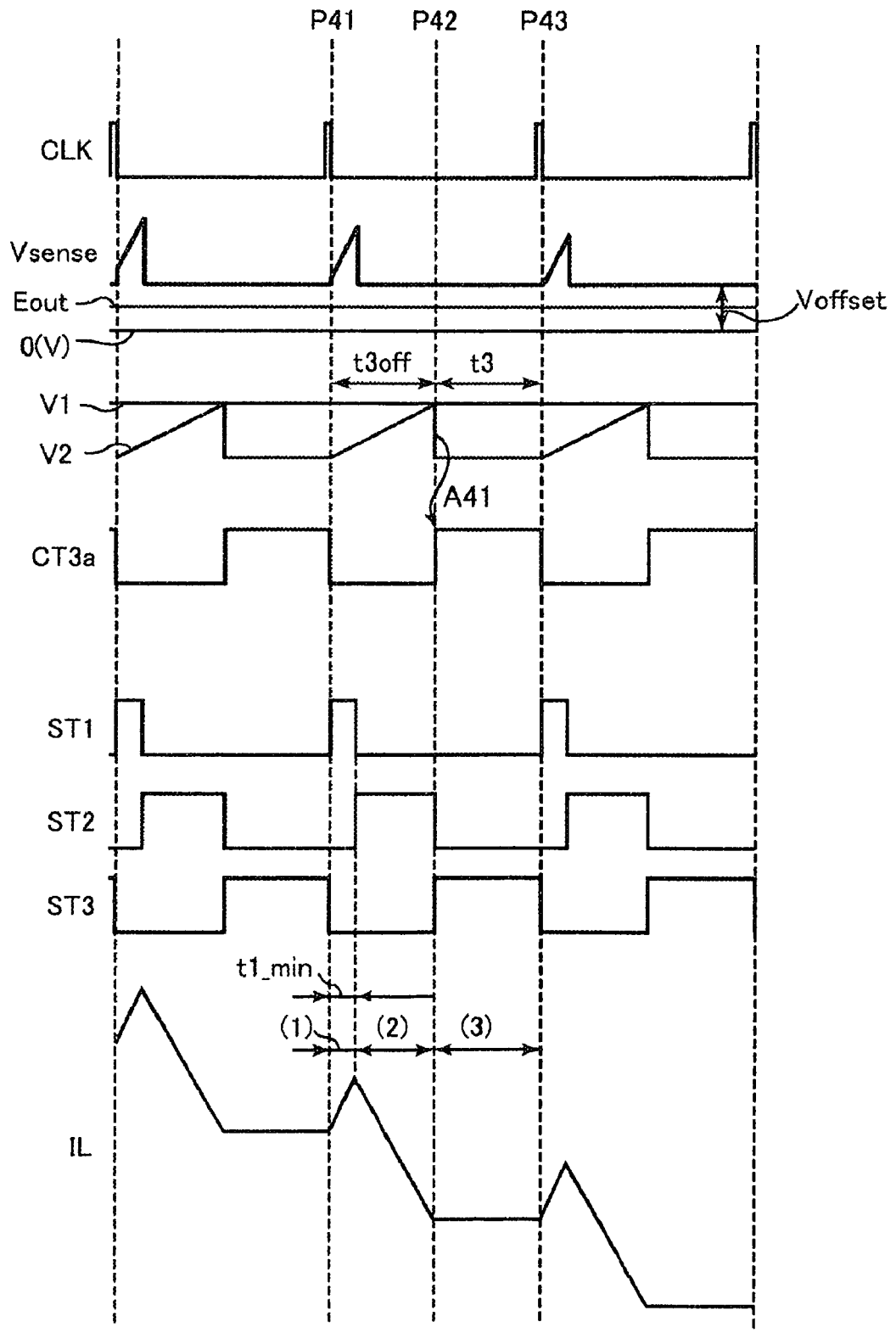
FIG. 13 illustrates a waveform diagram of the DC-DC converter in a transient response.

FIG. 13 illustrates a waveform diagram of the DC-DC converter 1a in the transient response. The load suddenly decreases as shown in FIG. 13. An output current Iout decreases, the output voltage Vout rises, and the output signal Eout drops. In FIG. 13, the level of the output signal Eout drops to equal to or lower than that of the offset voltage Voffset.

The state signal ST1 makes the transition to a high level in response to a falling edge of the clock pulse of the clock signal CLK at a point of time P41, thereby providing the transition to the state (1). The flip-flop FF (FIG. 11) is set in response to the falling edge of the clock signal CLK, and the control signal CT3a makes the transition to a low level.

The time period t1 of the state signal ST1 is fixed at a minimum value determined based upon a minimum PWM width of the PWM control circuit PCa during the transient response. After a minimum time period t1_min has elapsed, the state signal ST1 makes the transition to a low level and the state signal ST2 makes the transition to a high level, and the state (1) is switched to the state (2).

In a point of time P42 after the time period t3off has elapsed from the point of time P41, the control signal CT3a output from the state (3) time control circuit TC3a makes the transition to a high level, thereby switching the state (2) to the state (3). The state (3) is maintained until the point of time P43, at which the time period t3 has elapsed.

At the point of time P41, the current (Ic-Id) is stored in the capacitor C and the voltage V2 starts to rise. At the point of time P42, upon the voltage V2 reaching the output voltage V1, the control signal CT3a makes the transition to a high level, and the state (2) makes the transition to the state (3) (arrow A41). The time period t3 of the state (3) is determined based upon the rising gradient of the voltage V2.

In the transient response of the output voltage Vout, the level of the output signal Eout is made equal to or lower than that of the offset voltage Voffset. The current Id increases in response to a decrease in amount of the output signal Eout from the offset voltage Voffset. Since the current (Ic-Id) decreases upon the increase in the current Id, the rising gradient of the voltage V2 becomes less. The time period t3 of the state (3) becomes shorter in response to the decrease in amount of the output signal Eout from the offset voltage Voffset. In the transient response of the output voltage Vout, the time period t1 of the state (1) is defined as the fixed time. The time periods of state (2) and of the state (3) are PWM-controlled in response to the decrease in amount of the output signal Eout from the offset voltage Voffset.

In the DC-DC converter 1a according to the second embodiment, the state (3) time control circuit TC3a detects a state where the level of the output signal Eout becomes equal to or lower than that of the offset voltage Voffset. The DC-DC converter 1a makes the time period t3 of the state (3) shorter in response to the decrease in amount of the output signal Eout from the offset voltage Voffset. The PWM control is performed in the state (2) and in the state (3) in the transient response since an ON-duty state during the time period t2 of the state (2) is increased, greater energy is discharged to an output terminal Tout side owing to this, the inductor current IL quickly decreases.

In the DC-DC converter 1a according to the second embodiment, in the steady state illustrated in FIG. 12, the PWM control is performed in the state (1) and in the state (2) by fixing the time period t3. Since a period of the time period t1 is set to a given value, efficiency may be improved. In the transient response in a sudden increase in load as illustrated in FIG. 13, the PWM control is performed in the state (2) and in the state (3). Thus, an improvement of the efficiency in the steady state and a faster response speed in the transient response in the sudden increase in load may be achieved.

Figure 15:
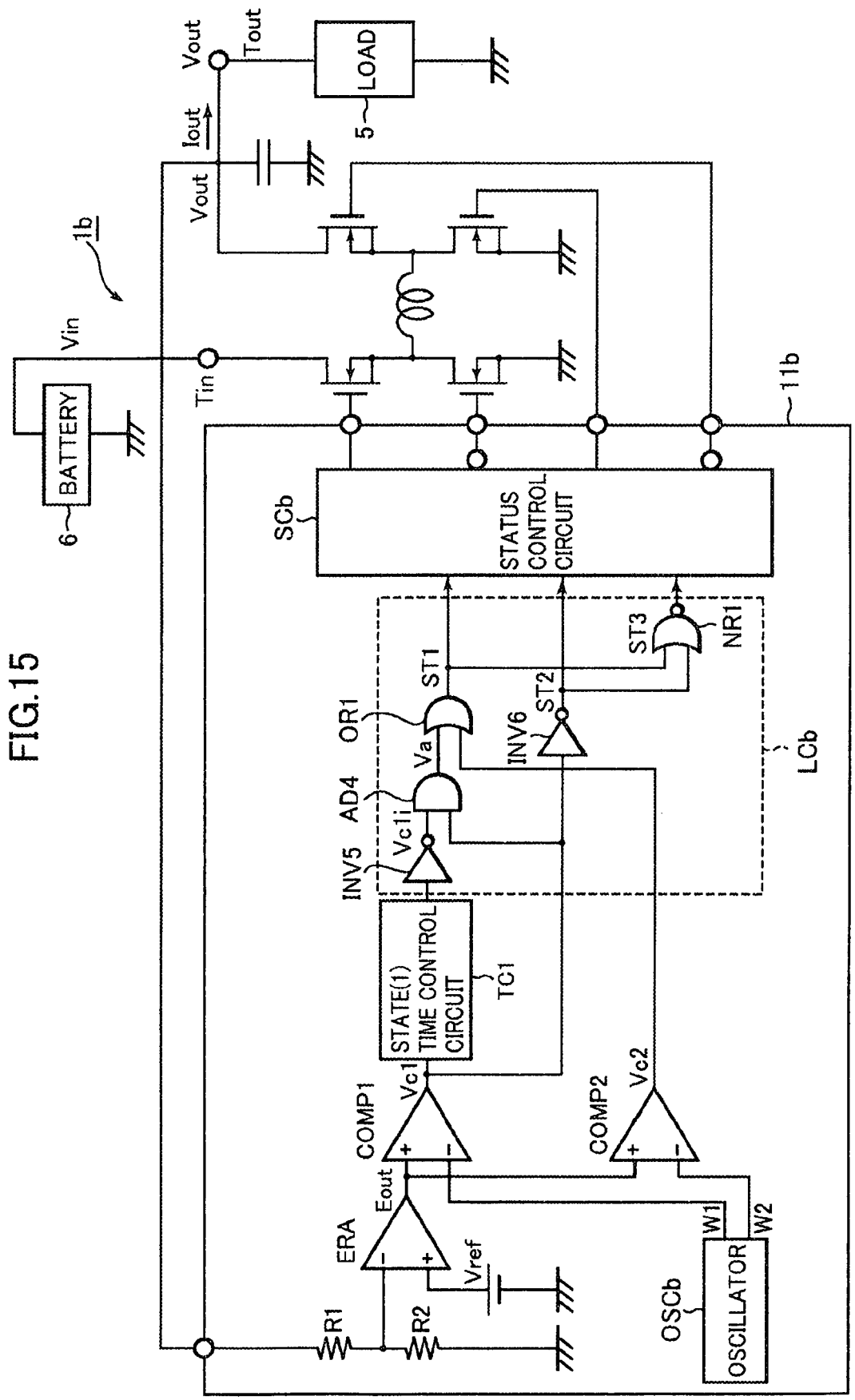
FIG. 15 illustrates a third embodiment.

FIG. 15 illustrates a third embodiment. In the first and the second embodiments, the time period t3 in the state (3) is defined as the fixed time. In the third embodiment, a time period t1 in a state (1) is defined as a fixed time. In a step down DC-DC converter 1b according to the third embodiment, speed of a transient response in a sudden increase in load is high.

A control circuit 11b illustrated in FIG. 15 includes an error amplifier ERA, comparators COMP1 and COMP2, a state (1) time control circuit TC1, a status control circuit SCb, an oscillator OSCb, a logic unit LCb, and resistor elements R1 and R2. The logic unit LCb includes an AND circuit AD4, an OR circuit OR1, a NOR circuit NR1, and inverters INV5 and INV6.

The oscillator OSCb outputs triangular waves W1 and W2. An output signal Eout is input to a non-inverting input terminal of the comparator COMP1 and the triangular wave W1 is input to an inverting input terminal of the comparator COMP1. The output signal Eout is input to a non-inverting input terminal of the comparator COMP2 and the triangular wave W2 is input to an inverting input terminal of the comparator COMP2. An output signal Vc1 output from the comparator COMP1 is input to a state (1) time control circuit TC1, the AND circuit AD4, and the inverter INV6. An output of the state (1) time control circuit TC1 is input via the inverter INV5 to the AND circuit AD4. An output signal Vc2 output from the comparator COMP2 and an output from the AND circuit AD4 are input to the OR circuit OR1. A state signal ST1 output from the OR circuit OR1 is input to the status control circuit SCb and the NOR circuit NR1. A state signal ST2 output from the inverter INV6 is input to the status control circuit SCb and the NOR circuit NR1. A state signal ST3 output from the NOR circuit NR1 is input to the status control circuit SCb. Other structural elements in the third embodiment are the same as those of the step up/step down DC-DC converter 1 (FIG. 1) in the first embodiment and detailed descriptions are reduced or omitted.

Figure 16:
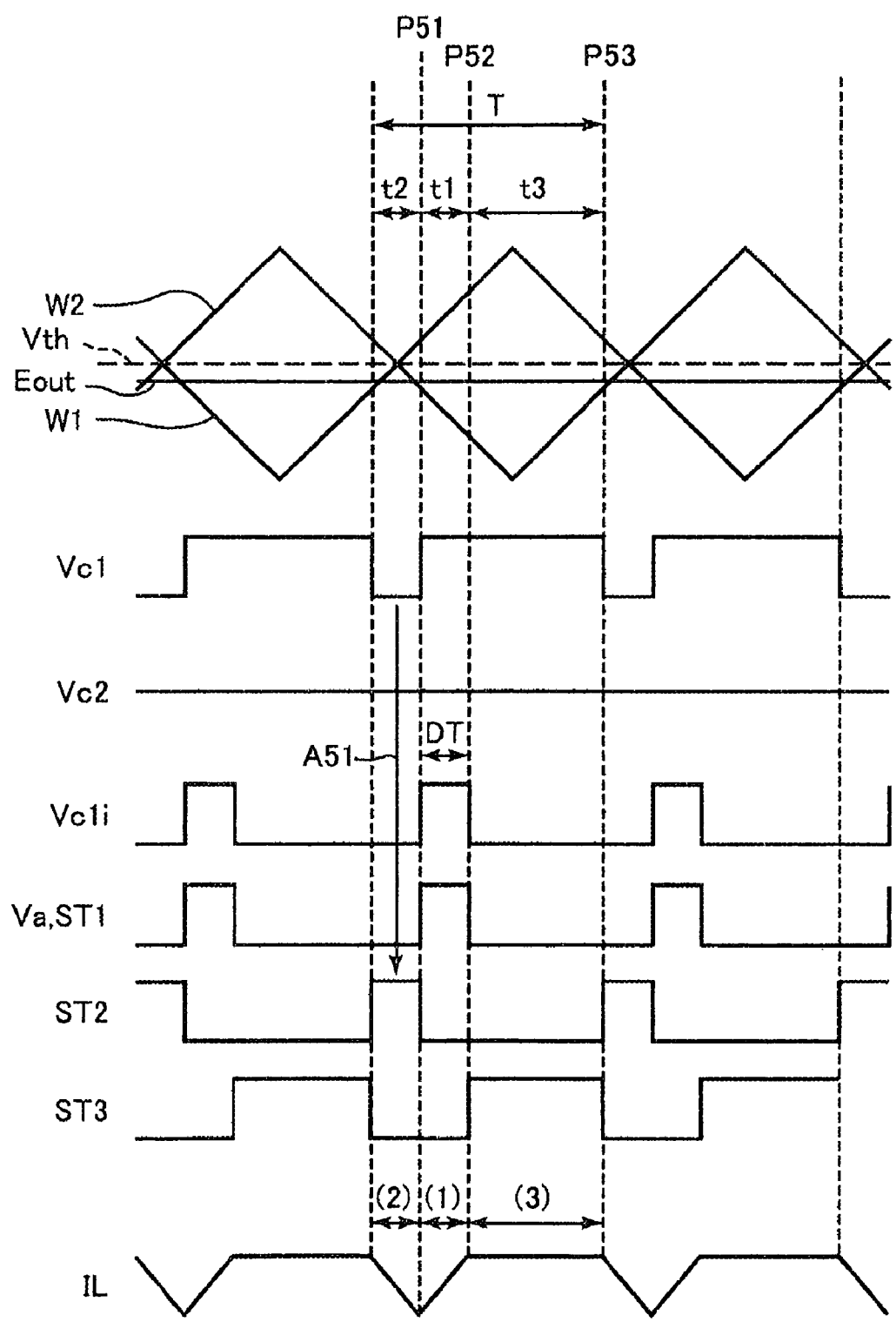
FIG. 16 illustrates a waveform diagram of a DC-DC converter in a steady state.

FIG. 16 illustrates a waveform diagram of the DC-DC converter 1b in a steady state. The two triangular waves W1 and W2 are generated so that a maximum value of the triangular wave W1 and a minimum value W2 of the triangular wave W2 come in contact with each other at a threshold value voltage Vth. When the level of the output signal Eout is equal to or lower than that of the threshold value voltage Vth, the comparator COMP1 compares the output signal Eout to the triangular wave W1. When the level of the output signal Eout is equal to or higher than that of the threshold value voltage Vth, the comparator COMP2 compares the output signal Eout to the triangular wave W2.

If the output voltage Vout is in the steady state, the level of the output signal Eout becomes equal to or lower than that of the threshold value Vth. The comparator COMP1 compares the output signal Eout and the triangular wave W1. In a time period t2 where the level of the output signal Eout is higher than that of the triangular wave W1, an output signal Vc1 becomes a low level and the state signal ST2 at a high level (arrow A51) is output from the inverter INV6. A transition to a state (2) is performed during the time period t2.

A delayed inverting signal Vc1i that is delayed by a given delay time DT with the state (1) time control circuit TC1 is output from the inverter INV6. An AND output Va of the output signal Vc1 and the delayed inverting signal Vc1i are output from the AND circuit AD4. The comparator COMP2 does not make a comparison and maintains the output signal Vc2 at a low level. The OR circuit OR1 chooses the AND output Va from the AND output Va and the output signal Vc2 to output as the state signal ST1. At a point of time P52, the state signal ST3 output from the NOR circuit NR1 makes a transition to a high level upon the state signal ST1 making a transition to a low level. At a point of time P53, the state signal ST2 makes the transition to a high level in response to a falling edge of the output signal Vc1 and the state signal ST3 makes a transition to a low level. The state (3) is terminated.

In the steady state, the time period t1 of the state (1) is determined based upon the delay time DT, which may be a constant value, regardless of an operation cycle T and a relationship between an input voltage Vin and an output voltage Vout. Time periods of the state (2) and the state (3) are PWM-controlled based upon the triangular wave W1 and the output signal Eout.

Figure 17:
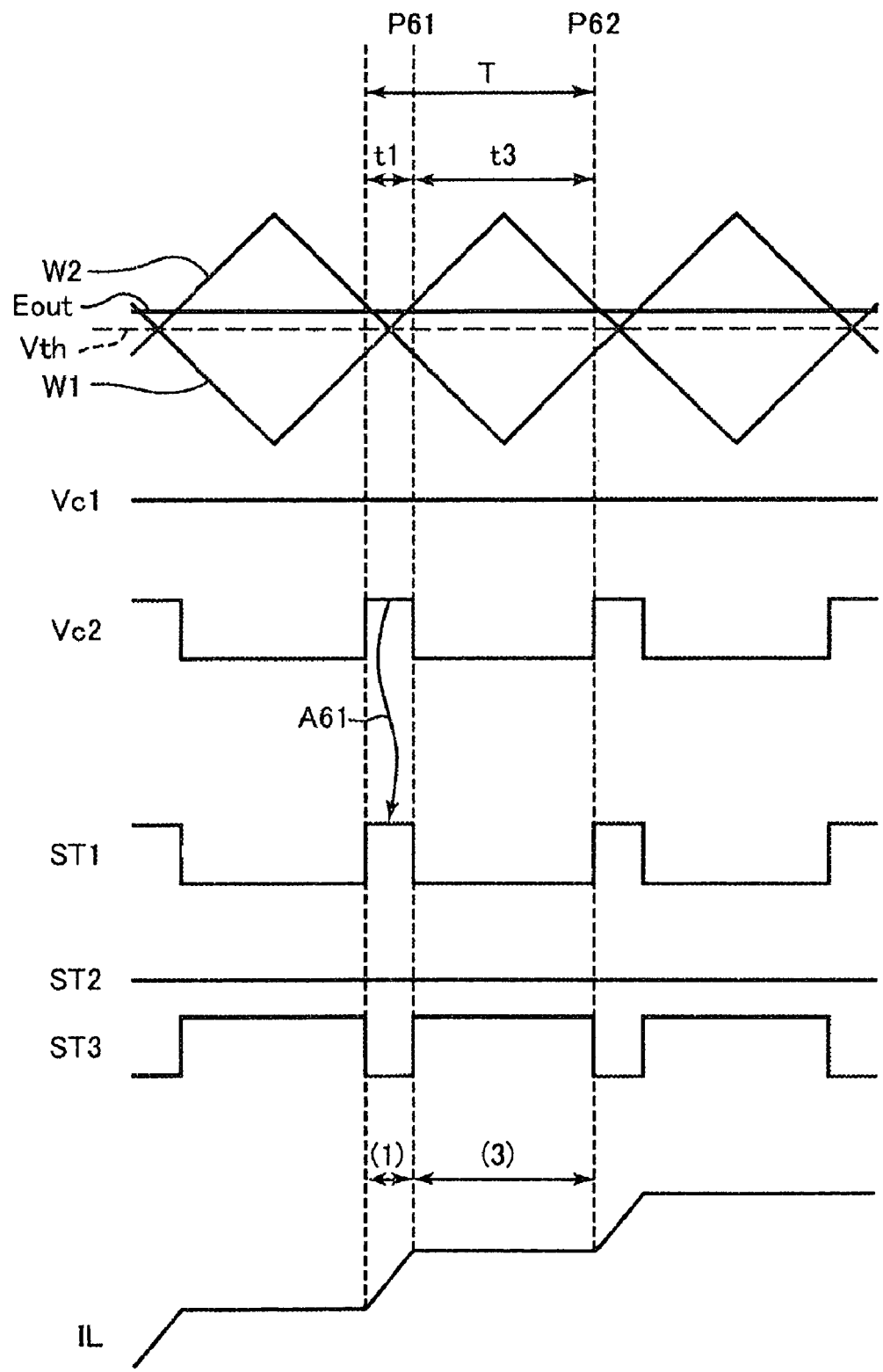
FIG. 17 illustrates a waveform diagram of the DC-DC converter in a transient response.

FIG. 17 illustrates a waveform diagram of the DC-DC converter 1b in the transient response. The output voltage Vout suddenly decreases and the output signal Eout suddenly increases.

The level of output signal Eout becomes equal to or higher than that of the threshold value voltage vth in the transient response. The comparator COM2 compares the output signal Eout and the triangular wave W21. In the time period t1 where the output signal Eout is higher than the triangular wave W2, the output signal Vc2 becomes a high level. The comparator COMP1 does not make a comparison and the comparator COMP1 maintains the output signal Vc1 at a high level since the OR circuit OR1 chooses the output signal Vc2 to output as the state signal ST1, a transition to the state (1) is performed (arrow A61). At a point of time P61, the state signal ST3 output from the NOR circuit NR1 makes the transition to a high level upon the state signal ST1 making the transition to a low level. A transition to the state (3) is performed. At a point of time P62, the state signal ST1 makes a transition to a high level in response to a rising edge of the output signal Vc2 and the state signal ST3 makes the transition to a low level. The state (3) is switched to the state (1).

The transition to the state (2) is not performed in the transient response. Time periods of the state (1) and the state (3) are PWM-controlled based upon on the triangular wave W2 and the output signal Eout.

In the DC-DC converter 1b according to the third embodiment, the time period t1 is defined as a fixed period and the PWM control is performed in the state (2) and in the state (3) during the steady state. Since the waveforms as illustrated in FIGS. 6A to 6C are achieved, efficiency may be improved. In the DC-DC converter 1b, the transition to the state (2) is not performed in the transient response in a sudden increase in load and the PWM control is performed in the state (1) and in the state (3). Since the time period of the state (1) is made longer in response to load states, speed in the transient response may be improved. In the steady state, the PWM control is performed in the state (1) and in the state (2). On the other hand, the PWM control is performed in the state (1) and in the state (3) in the transient response. As a result, an improvement of the efficiency in the steady state and a faster response speed in the transient response in the sudden increase in load may be achieved.

Since the input voltage vin and the output voltage Vout are close to one another in the above embodiments, a gradient of a current sensing signal Vs in the state (3) is substantially zero or close to zero. However, the present embodiments are not limited. The present embodiments are applicable to any case where the input voltage Vin is higher than the output voltage Vout or where the input voltage Vin is lower than the output voltage Vout.

A compensation signal may be added to a current sensing signal Vsense and the output signal Eout to achieve stabilized control.

The transistors FET2 and FET4 are used as synchronous rectifying elements in the embodiments. However, a diode element that performs rectification may also be used. For example, at least one of the transistors FET2 and FET4 may be replaced with the diode. It is also possible to provide diodes arranged in parallel to at least one of the transistors FET2 and FET4.

Although the transistors FET1, FET2, FET3, and FET4 are N-type FET, any of the transistors FET1, FET2, FET3, and FET4 or all of the transistors FET1 to FET4 may be replaced with a P-type transistor.

Although the inductor current IL induced to flow through the choke coil L1 is detected in the above embodiments, it is possible that a current, which is induced to flow through either the transistor FET1 or the transistor FET3, or both transistors, may be detected.

The control circuits 11, 11a, and 11b in the embodiments may be formed as a single semiconductor chip or as a plurality of semiconductor chips. Alternatively, the DC-DC converter may be formed as a single semiconductor chip, as a plurality of semiconductor chips, or as a module.

Example embodiments of the present invention have now been described in accordance with the above advantages. It will be appreciated that these examples are merely illustrative of the invention. Many variations and modifications will be apparent to those skilled in the art.

The invention claimed is:

1. A DC-DC converter comprising:
a control unit that controls a current stored in an inductance and an output voltage output from an output terminal electrically couplable to the inductance;
wherein, when the output voltage is lower than a given value in response to a load electrically couplable to the output terminal, the control unit assigns a first period and a second period to a given period,
wherein the first period is where a current is stored in the inductance in response to an input voltage and a reference voltage, and the second period is where the current stored in the inductance is supplied to the output terminal in response to the input voltage and the output voltage,
wherein, when the output voltage is equal to or higher than the given value, the control unit assigns the first period, the second period, and a third period in which the current stored in the inductance is supplied to the output terminal in response to the output voltage and the reference voltage, to the given period,
wherein, when the output voltage is equal to or higher than the given value, the control unit performs either fixing the second period in the given period and controlling the first period and the third period, or fixing the first period in the given period and controlling the second period and the third period.

2. The DC-DC converter according to claim 1, wherein the control unit controls a ratio between the first period and the second period.

3. The DC-DC converter according to claim 1, further comprising:
a signal generation unit that generates a cyclic signal;
wherein the control unit controls the first period and the second period in response to a comparison result between the output voltage and the cyclic signal.

4. The DC-DC converter according to claim 3, further comprising:
a first period control unit that sets a fixed time of the first period in the given period equal to a minimum on-pulse time.

5. The DC-DC converter according to claim 1, wherein the control unit controls the first period and the second period in response to a comparison result between the output voltage and a current of the inductance.

6. The DC-DC converter according to claim 1, wherein a fixed time in the second period is obtained by the equation $(Vin/Vout) \times (T - t1\_min) - t1\_min$,
wherein Vin is the input voltage, Vout is the output voltage, T is the given period, and t1_min is a minimum period of the first period determined by a circuit configuration of the DC-DC converter.

7. The DC-DC converter according to claim 1, further comprising:
a second period control unit that sets a fixed time of the second period in the given period in response to the input voltage and the output voltage.

8. The DC-DC converter according to claim 1, further comprising:
a comparison unit that compares the input voltage to the output voltage; and
a timer unit that starts measurement of time in response to a start of the given period and terminates the measurement of time in response to an elapse of the fixed time of the second period determined in response to a comparison result by the comparison unit.

9. The DC-DC converter according to claim 1, further comprising:
a mask circuit that masks a second period signal determining the second period and a third period signal determining the third period in the given period, and masks the second period signal within the third period.

10. The DC-DC converter according to claim 1, further comprising:
a logic circuit that outputs a second period signal determining the second period when the output voltage is equal to or higher than the given value, masks the second period signal when the output voltage is lower than the given value, and outputs a third period signal which notifies that a process corresponding to the third period is performed where a first period signal determining the first period notifies that a process corresponding to the first period is not performed and where the second period signal notifies that a process corresponding to the second period is not performed.

11. The DC-DC converter according to claim 1, wherein the given period is a single operation cycle of the DC-DC converter.

12. An electronic device comprising:
a DC-DC converter;
an inductance that is electrically couplable to the DC-DC converter;
an output terminal that is electrically couplable to the inductance; and
a circuit that is electrically couplable to the output terminal,
wherein the DC-DC converter includes a control unit that controls a current stored in the inductance and controls an output voltage output from the output terminal, and wherein, when the output voltage output from the output terminal is lower than a given value, the control unit assigns a first period and a second period to a given period, wherein the first period is where a current is stored in the inductance in response to an input voltage and a reference voltage, and the second period is where the current stored in the inductance is supplied to the output terminal in response to the input voltage and the output voltage, wherein, when the output voltage is equal to or higher than the given value, the control unit assigns the first period, the second period, and a third period in which the current stored in the inductance is supplied to the output terminal in response to the output voltage and the reference voltage, to the given period, wherein, when the output voltage is equal to or higher than the given value, the control unit performs either fixing the second period in the given period and controlling the first period and the third period, or fixing the first period in the given period and controlling the second period and the third period.

13. The electronic device according to claim 12, wherein, when the output voltage is equal to or higher than the given value, the control unit assigns the first period, the second period, and a third period in which the current stored in the inductance is supplied to the output terminal in response to the output voltage and the reference voltage, to the given period.

14. The electronic device according to claim 13, wherein, when the output voltage is equal to or higher than the given value, the control unit performs either fixing the second period in the given period and controlling the first period and the third period, or fixing the first period in the given period and controlling the second period and the third period.

15. A method of controlling a DC-DC converter comprising:
storing a current in an inductance in response to an input voltage and a reference voltage when an output voltage output from an output terminal is lower than a given value in response to a load;
supplying the output terminal with the current stored in the inductance in response to the input voltage and the output voltage;
assigning a first period in a given period in which the current is stored in the inductance and a second period in the given period in which the current stored in the inductance is supplied to the output terminal;
assigning the first period, the second period, and a third period in which the current stored in the inductance is supplied to the output terminal in response to the output voltage and the reference voltage, to the given period, when the output voltage is equal to or higher than the given value; and
performing either fixing the second period in the given period and controlling the first period and the third period, or fixing the first period in the given period and controlling the second period and the third period, when the output voltage is equal to or higher than the given value.

16. The method of controlling the DC-DC converter according to claim 15, further comprising:
assigning the first period and the second period in response to a comparison result between a cyclic signal and the output voltage.

17. The method of controlling the DC-DC converter according to claim 15, further comprising:
assigning the first period and the second period in response to a comparison result between the output voltage and a current of the inductance.

18. The method of controlling the DC-DC converter according to claim 15, further comprising:
storing the current in the inductance in response to the input voltage and the reference voltage when the output voltage is equal to or higher than the given value;
supplying the output terminal with the current stored in the inductance in response to the output voltage and the reference voltage; and
supplying the output terminal with the current stored in the inductance in response to the input voltage and the output voltage.

19. The method of controlling the DC-DC converter according to claim 15, further comprising:
when the output voltage is equal to or higher than the given value,
performing either fixing the second period in the given period and assigning the first period and a third period in which the current stored in the inductance is supplied to the output terminal in response to the output voltage and the reference voltage, or fixing the first period in the given period and assigning the second period and the third period.

* * * * *